(12) United States Patent
Akita et al.

(10) Patent No.: US 10,225,477 B2
(45) Date of Patent: Mar. 5, 2019

(54) IMAGING APPARATUS AND DISPLAY CONTROL METHOD THEREOF

(71) Applicant: Sony Corporation, Tokyo (JP)

(72) Inventors: Miho Akita, Tokyo (JP); Kazuyuki Marukawa, Kanagawa (JP); Sho Tanaka, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/585,754

(22) Filed: May 3, 2017

(65) Prior Publication Data

US 2017/0237906 A1    Aug. 17, 2017

Related U.S. Application Data

(63) Continuation of application No. 14/597,527, filed on Jan. 15, 2015, now Pat. No. 9,674,446, which is a
(Continued)

(30) Foreign Application Priority Data

Nov. 5, 2008   (JP) ................................ 2008-284294

(51) Int. Cl.
*H04N 5/77* (2006.01)
*H04N 9/80* (2006.01)
(Continued)

(52) U.S. Cl.
CPC ......... *H04N 5/23293* (2013.01); *G03B 13/04* (2013.01); *G03B 17/02* (2013.01);
(Continued)

(58) Field of Classification Search
CPC .......... H04N 5/775; H04N 5/77; H04N 5/932; H04N 5/935; H04N 9/80
(Continued)

(56) References Cited

U.S. PATENT DOCUMENTS 5,930,446 A    7/1999 Kanda
6,292,620 B1   9/2001 Ohmori et al.
(Continued)

FOREIGN PATENT DOCUMENTS

CN    1835557 A    9/2006
JP    2003324632 A    11/2003
(Continued)

OTHER PUBLICATIONS

Machine Translation for JP 2008-228053, Kanzaki Masatoshi, Camera, Sep. 25, 2008.*
(Continued)

*Primary Examiner* — Daquan Zhao
(74) *Attorney, Agent, or Firm* — Lerner, David, Littenberg, Krumholz & Mentlik, LLP

(57) ABSTRACT

An imaging apparatus includes: a first display panel unit for executing display toward a user side; a second display panel unit for executing display toward a subject side; an imaging processing unit for subjecting incident light from the subject side to photoelectric conversion to obtain a captured image signal; a recording processing unit for executing a recording process to a recording medium regarding the captured image signal obtained at the imaging processing unit; and a control unit for controlling the display states of the first display panel unit and the second display panel unit for each of a plurality of various types of operation periods changing along with the operation of the imaging processing unit or the recording processing unit, and executing display control wherein the first display panel unit and the second display panel unit can have different display content during at least a single operation period.

17 Claims, 19 Drawing Sheets

Related U.S. Application Data continuation of application No. 13/658,154, filed on Oct. 23, 2012, now Pat. No. 8,977,101, which is a continuation of application No. 12/589,206, filed on Oct. 20, 2009, now Pat. No. 8,325,264.

(51) Int. Cl.

| | | |
|---|---|---|
| *H04N 5/232* | (2006.01) | |
| *G03B 13/04* | (2006.01) | |
| *G03B 17/02* | (2006.01) | |
| *G03B 19/02* | (2006.01) | |
| *H04N 5/91* | (2006.01) | |
| *H04N 5/775* | (2006.01) | |
| *H04N 5/935* | (2006.01) | |
| *H04N 5/932* | (2006.01) | |

(52) U.S. Cl.
CPC ......... *G03B 19/02* (2013.01); *H04N 5/23216* (2013.01); *H04N 5/23219* (2013.01); *H04N 5/23241* (2013.01); *H04N 5/772* (2013.01); *H04N 5/91* (2013.01)

(58) Field of Classification Search
USPC ............... 386/230, 224, 239, 240, 218, 219
See application file for complete search history.

(56) References Cited

U.S. PATENT DOCUMENTS

| | | | |
|---|---|---|---|
| 6,584,272 B1* | 6/2003 | Fukushima | H04N 5/76 386/230 |
| 6,853,403 B1 | 2/2005 | Inoue et al. | |
| 7,424,218 B2 | 9/2008 | Baudisch et al. | |
| 7,493,571 B2* | 2/2009 | Shinohara | H04N 5/23293 715/810 |
| 7,593,566 B2* | 9/2009 | Kato | G06K 9/6203 345/441 |
| 8,325,264 B2 | 12/2012 | Akita et al. | |
| 8,520,120 B2 | 8/2013 | Akita et al. | |
| 2002/0142010 A1 | 10/2002 | Graham | |
| 2003/0112259 A1 | 6/2003 | Kinjo | |
| 2003/0125079 A1 | 7/2003 | Park et al. | |
| 2004/0073827 A1 | 4/2004 | Tsirkel et al. | |
| 2004/0169769 A1* | 9/2004 | Tatamiya | H04N 5/23293 348/370 |
| 2005/0141063 A1* | 6/2005 | Nishino | H04N 5/23293 358/527 |
| 2005/0219393 A1 | 10/2005 | Sugimoto | |
| 2006/0050151 A1* | 3/2006 | Fujinawa | H04N 1/00442 348/207.99 |
| 2006/0210263 A1 | 9/2006 | Oh | |
| 2007/0115382 A1 | 5/2007 | Fukuma et al. | |
| 2007/0242947 A1* | 10/2007 | Matsushima | G03B 17/14 396/429 |
| 2008/0231740 A1* | 9/2008 | McIntyre | H04N 5/2251 348/333.01 |

FOREIGN PATENT DOCUMENTS

| | | | | |
|---|---|---|---|---|
| JP | 2004260501 A | 9/2004 | | |
| JP | 2005318258 A | 11/2005 | | |
| JP | 2007-158799 A | 6/2007 | | |
| JP | 2007158799 A | 6/2007 | | |
| JP | 2008-228053 | * | 9/2008 | ............ H04N 5/225 |
| JP | 2008-228053 A | 9/2008 | | |

OTHER PUBLICATIONS

Office Action from Japanese Application No. 2008-284294, dated Oct. 19, 2010.
Office Action from Japanese Application No. 2011-024642, dated Feb. 5, 2013.
Office Action from Chinese Application No. 2011-10339314.0, dated Aug. 19, 2014.
Korean Office Action for KR Application No. 20090098105, dated Jul. 23, 2015.
Machine translation of JP2008-228053, Sep. 2008, Kanzaki et al.

* cited by examiner

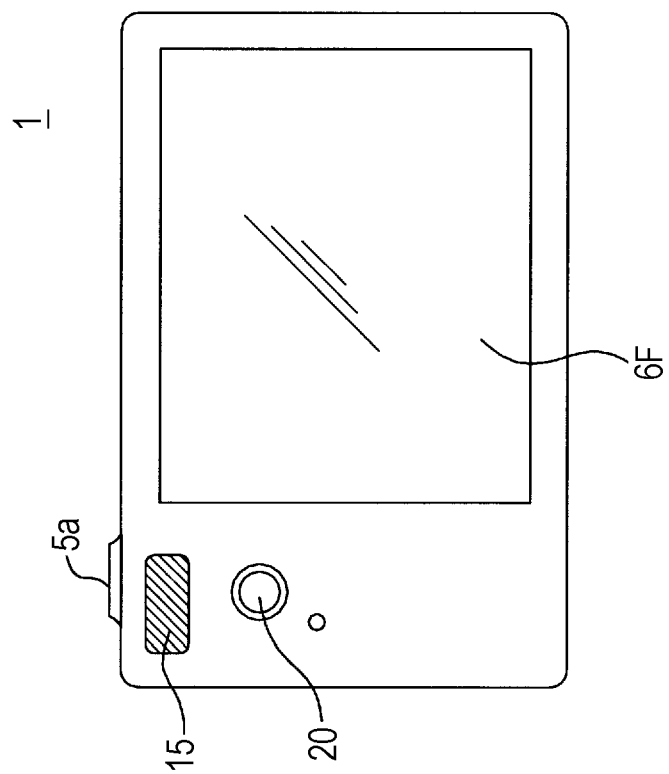
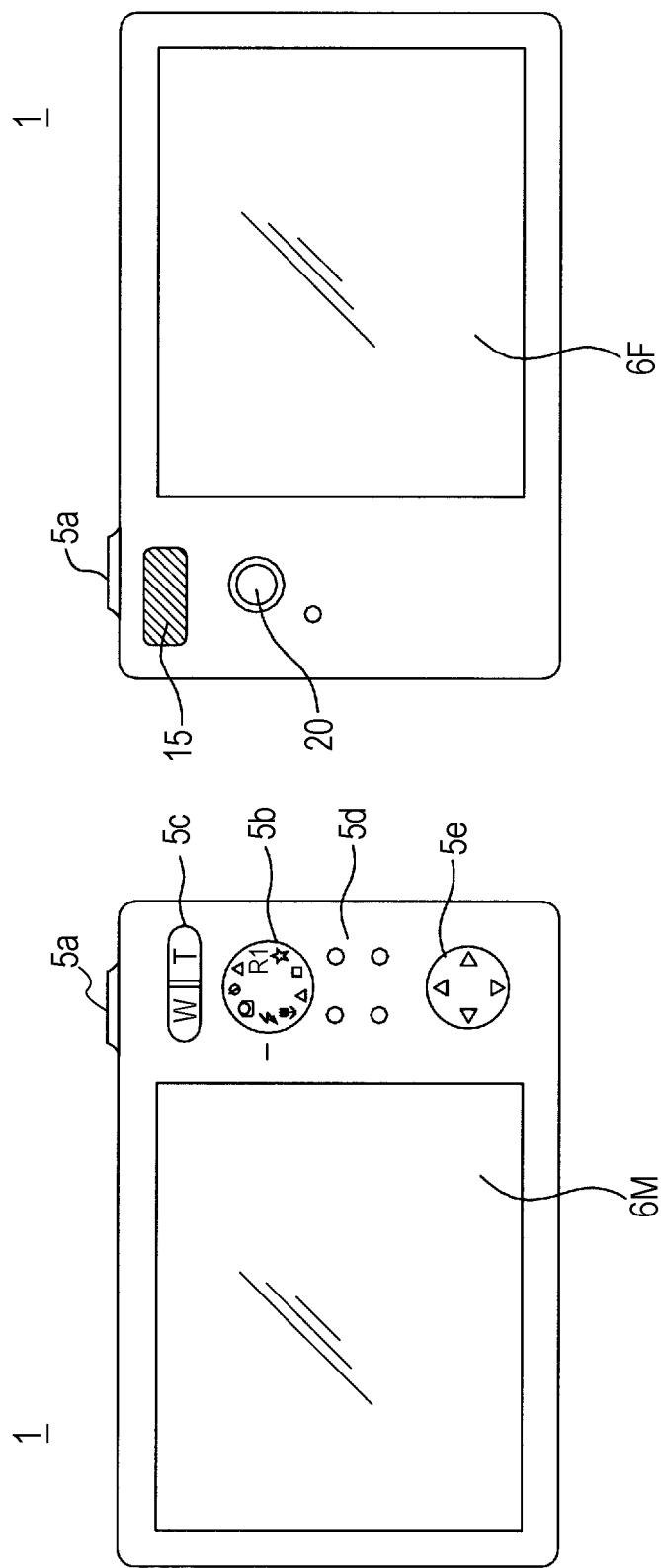

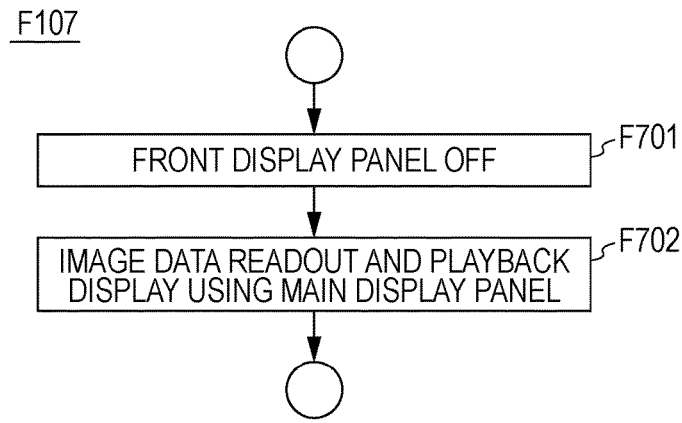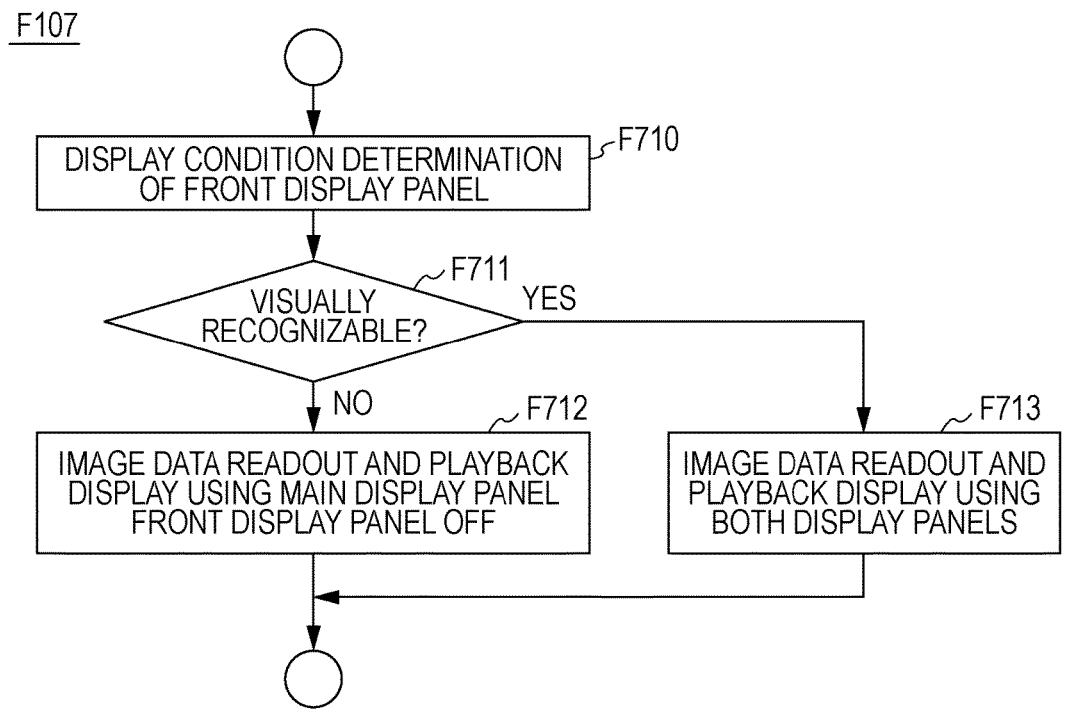

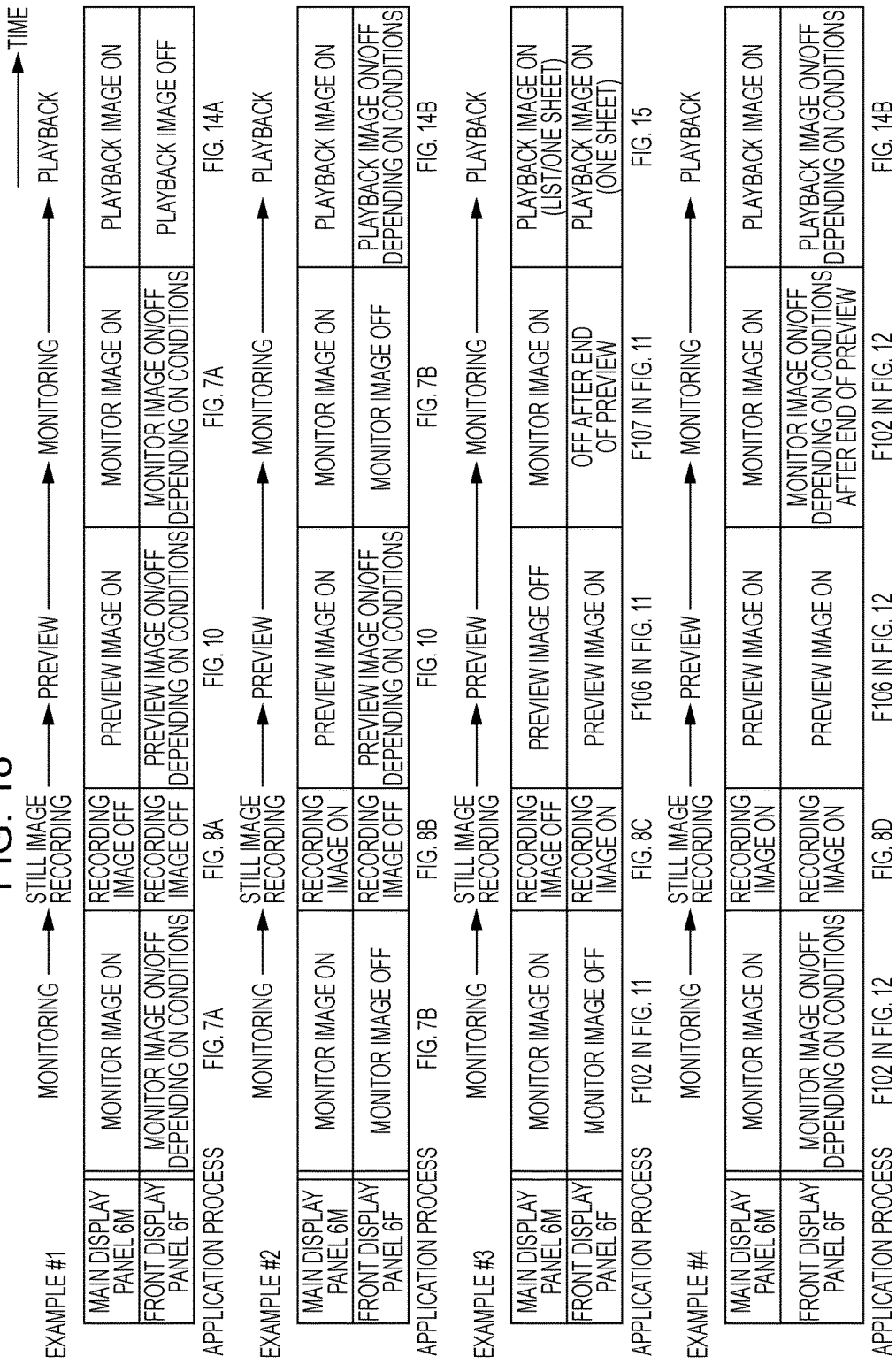

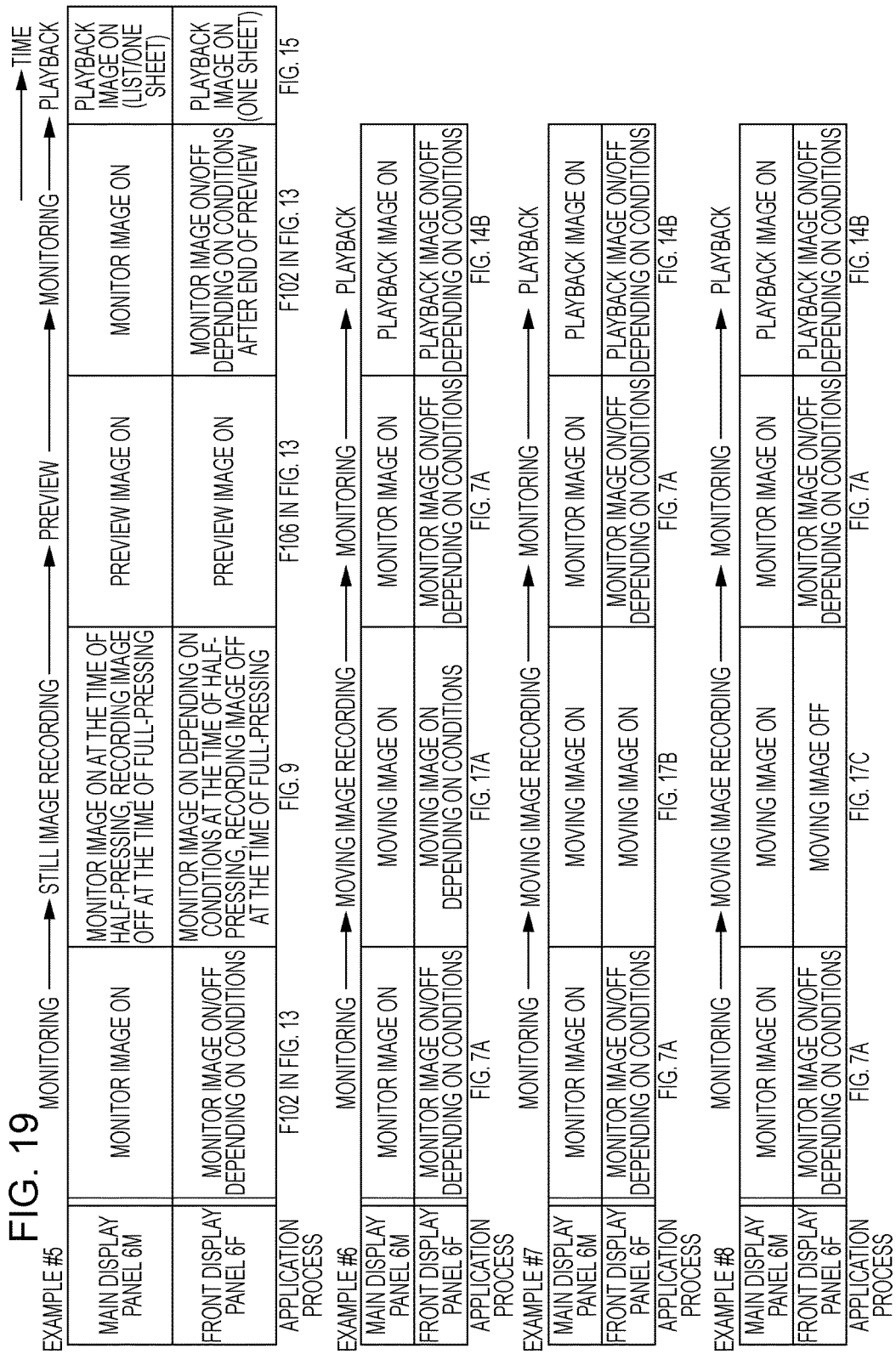

IMAGING APPARATUS AND DISPLAY CONTROL METHOD THEREOF

CROSS-REFERENCE TO RELATED APPLICATION

The present application is a continuation of U.S. patent application Ser. No. 14/597,527, filed on Jan. 15, 2015, which is a continuation of U.S. patent application Ser. No. 13/658,154, filed on Oct. 23, 2012, (U.S. Pat. No. 8,977, 101), which is a continuation of U.S. patent application Ser. No. 12/589,206, filed on Oct. 20, 2009, (U.S. Pat. No. 8,325,264) which claims priority from Japanese Patent Application No. JP 2008-284294 filed in the Japanese Patent Office on Nov. 5, 2008, the disclosures of which are incorporated herein by reference.

BACKGROUND OF THE INVENTION

Field of the Invention

The present invention relates to an imaging apparatus and the display control method thereof, and specifically relates to the display operation of an imaging apparatus wherein multiple display panel units are provided on the casing thereof.

Description of the Related Art

Imaging apparatuses such as digital still cameras, digital video cameras, and so forth have come into widespread use, and with many of them, a display panel made up of a liquid crystal panel or the like is formed.

For example, as disclosed in Japanese Unexamined Patent Application Publication No. 2007-158799, an arrangement is made wherein a display panel is provided on a camera casing with a relatively great area, monitoring of a subject image is executed at the time of imaging, and playback display is executed at the time of playback of a captured image.

SUMMARY OF THE INVENTION

Now, the present assignee has newly conceived an arrangement for providing two display panel units on the casing of an imaging apparatus. Specifically, similar to the related art, in addition to a display panel unit configured to execute display toward the user (the person using the imaging apparatus) direction on an imaging apparatus casing, a display panel unit configured to execute display toward a subject side is provided to the front face side (side serving as a subject side) or the like on the apparatus casing.

Thus, in the case that such two display panel units are provided, suitable display should be made at each display panel, i.e., display using the two display panels effectively, display effective for a person viewing the display, and further display operation so as to avoid wasteful consumption power, according to the operation state or situation relating to imaging.

It has been found to be desirable to realize suitable display at an imaging apparatus including two display panel units.

According to an embodiment of the present invention, an imaging apparatus includes: a first display panel unit configured to execute display toward a user side, disposed on an apparatus casing; a second display panel unit configured to execute display toward a subject side, disposed on the apparatus casing; an imaging processing unit configured to subject incident light from the subject side to photoelectric conversion to obtain a captured image signal; a recording processing unit configured to execute a recording process to a recording medium regarding the captured image signal obtained at the imaging processing unit; and a control unit configured to control the display states of the first display panel unit and the second display panel unit for each of a plurality of various types of operation periods changing along with the operation of the imaging processing unit or the recording processing unit, and execute display control wherein the first display panel unit and the second display panel unit can have different display content during at least a single operation period.

The operation periods that change may include: a monitoring period arranged to execute monitoring display of the captured image signal obtained at the imaging processing unit without executing a recording process at the recording processing unit; a recording period arranged to subject the captured image signal obtained at the imaging processing unit to a recording process at the recording processing unit as still image data; and a preview period arranged to display the still image data according to the recording process of the recording period.

The control unit may control the first display panel unit to display the captured image signal obtained at the imaging processing unit as a monitoring image, and control execution/non-execution of display of the monitoring image at the second display panel unit based on the determination process results of visual recognition possibility conditions as to the second display panel, during the monitoring period.

In this case, the determination process of the visual recognition possibility conditions is a determination process regarding whether or not there is a person at the subject side, a determination process of an imaging mode, a determination process regarding internal detection information, or a determination process regarding the image analyzing process results of a captured image signal.

Also, the control unit may control the first display panel unit to display the captured image signal obtained at the imaging processing unit as a monitoring image, and control the second display panel unit not to execute display of the monitoring image, during the monitoring period.

Also, the control unit may control only one of the first display panel unit and the second display panel unit to execute display of still image data according to the recording process at the recording processing unit during the recording period.

Also, the control unit may control both or neither of the first display panel unit and the second display panel unit to execute display of still image data according to the recording process at the recording processing unit during the recording period.

Also, the control unit may control only one of the first display panel unit and the second display panel unit to execute display of still image data according to the recording process at the recording processing unit during the preview period.

Also, the control unit may control both of the first display panel unit and the second display panel unit to execute display of still image data according to the recording process at the recording processing unit, and further controls the second display panel unit to execute display of the still image data for a longer period as compared to the first display panel unit, during the preview period.

Also, the operation periods may further include a playback period arranged to play and display image data recorded in a recording medium, with the control unit controlling only one of the first display panel unit and the second display panel unit to execute the playback display during the playback period.

Also, the operation periods may further include a playback period arranged to play and display image data recorded in a recording medium, with the control unit controlling the first display panel unit to execute the playback display, and controlling execution/non-execution of the playback display at the second display panel unit based on the determination process results of visual recognition possibility conditions as to the second display panel, during the playback period.

Also, the operation periods may further include a playback period arranged to play and display image data recorded in a recording medium, with the control unit controlling the first display panel unit to selectively execute list display and single image display serving as the playback display, and controlling the second display panel unit to execute only single image display, during the playback period.

Also, the operation periods may further include a moving image recording period arranged to subject the captured image signal obtained at the imaging processing unit to a recording process at the recording processing unit as moving image data, with the control unit controlling the first display panel unit to execute moving image display according to the recording process, and controlling execution/non-execution of the moving image display at the second display panel unit based on the determination process results of visual recognition possibility conditions as to the second display panel.

According to an embodiment of the present invention, a display control method for an imaging apparatus including as operation periods of the imaging apparatus at least a monitoring period arranged to execute monitoring display of a captured image signal obtained at an imaging process without executing a recording process, a recording period arranged to subject the captured image signal obtained at the imaging process to a recording process as still image data, and a preview period arranged to display the still image data according to the recording process, the display control method including the steps of: controlling the display states of a first display panel unit configured to execute display toward a user side, disposed on an apparatus casing, and a second display panel unit configured to execute display toward a subject side, disposed on the apparatus casing, for each of the operation periods; and executing display control whereby the first display panel unit and the second display panel unit can have different display content during at least a single or more operation periods.

That is to say, with the above configurations, the display states of the first display panel unit and the second display panel unit are controlled for each of the various operation periods that changes during a stage of the operation of the imaging apparatus. Particularly, display control is executed whereby the first display panel unit and the second display panel unit can have different display content during at least one or more operation periods. Different display content means here a state in which different images are displayed, or a state in which one of the panel units is set to display off. Also, that can have different display content means that can be different display content, for example, depending on determination of visual recognition possibility conditions.

According to such control, suitable display, effective display, prevention of wasteful display, or the like is realized at each display panel unit for each of various display periods.

For example, when changing to the monitoring period, still image recording period, preview period, playback period, moving image recording period, or the like, the corresponding display state is controlled according to the purpose of display, whether or not there is a person viewing the display, or the like.

Also for example, with regard to the second display panel unit, during a monitoring period or the like, the possibility of whether or not there is a person at the subject side is determined, so as to execute display control accordingly.

Also for example, during the monitoring period at the time of imaging of a still image (when awaiting a suitable timing for imaging of a still image), the user of the imaging apparatus (i.e., a user who attempts to perform imaging of a still image with the imaging apparatus) performs monitoring of a subject image using the first display panel unit. This monitoring image is a captured image signal to be obtained at the imaging device unit during that period, also referred to as a through image, a real time moving image of a subject scene. The user confirms the subject image thus imaged to perform a release operation (shutter operation) at a desired timing. This is the same as with a common imaging apparatus.

During this monitoring period, with the second display panel unit, it is suitable to execute display based on a captured image signal, i.e., display a monitoring image serving as a through image. For example, in the case that a subject is a person, the person thereof can confirm his facial expression, pose, or the like to be imaged through the display of the second display panel unit.

However, this is effective only when the person is on the subject side. For example, when the user selects a scenery mode serving as an imaging mode, and attempts to image scenery where there is no person, it can be conceived that there is no person who view the display of the second display panel unit. Therefore, in such a case, there is no meaning even if a monitoring image is displayed on the second display panel unit. Consequently, it is suitable to attempt to perform power saving by turning off the second display panel unit.

Thus, the display operations of the first and second display panel units are controlled suitably according to the operation period at that time, whereby useful display or more enjoyable display by the two display panel units, avoidance of increase in excessive consumption power even if the two display panel units are provided, or the like can be realized.

According to the above configurations, with an imaging apparatus, two display panel units are provided whereby the user side and the subject side can visually recognize their sides respectively, and each display panel can execute suitable display for each of the operation periods. That is to say, useful display using the two display panel units effectively, display with high enjoyableness, avoidance of wasteful display, or the like can be realized, and accordingly, a new and useful imaging apparatus can be provided.

Particularly, whether or not there is a person at the subject side who can view the second display panel and the display thereupon unit is assumed, and the display operation of the second display panel unit is controlled accordingly, thereby promoting the above advantages.

BRIEF DESCRIPTION OF THE DRAWINGS

FIGS. 1A and 1B are explanatory diagrams of an external view example of am imaging apparatus according to an embodiment of the present invention;

FIGS. 14A and 14B are flowcharts of a process example of a playback period according to the embodiment;

FIG. 18 is an explanatory diagram of an example of the transition of a display state according to the embodiment; and FIG. 19 is an explanatory diagram of an example of the transition of a display state according to the embodiment.

DESCRIPTION OF THE PREFERRED EMBODIMENTS

Figure 2:
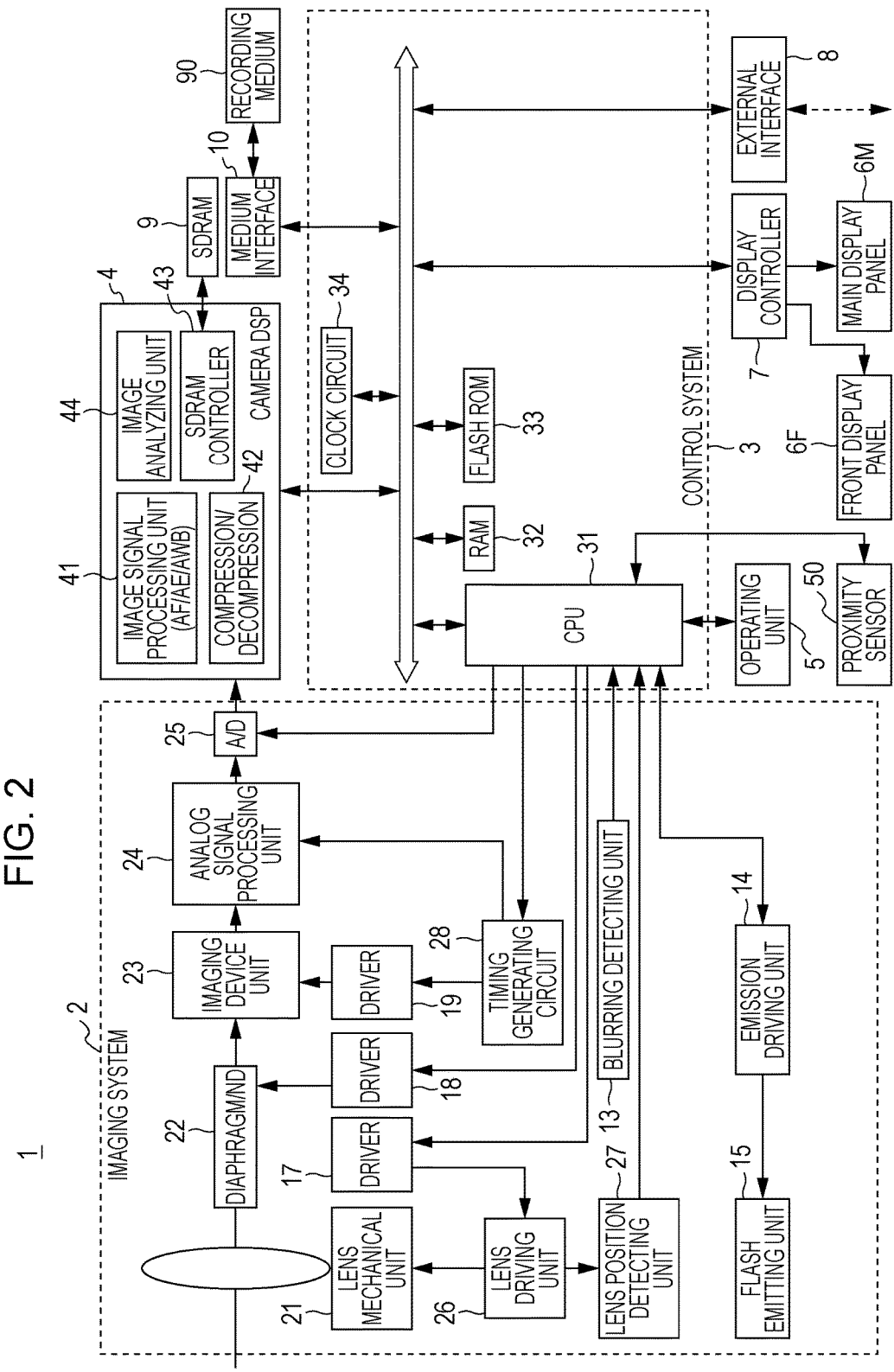
FIG. 2 is a block diagram of the imaging apparatus according to the embodiment.

Description will be made below regarding an embodiment of the present invention in accordance with the following sequence.

1. Configuration of Imaging Apparatus
2. Operation Transition
3. Screen Display Examples of Both Display Panel Units
4. Display Control Examples
   4-1. Process Examples to Execute Transition of Operation Period
   4-2. Process Examples during Monitoring Period
   4-3. Process Examples during Recording Period
   4-4. Process Examples during Preview Period
   4-5. Process Examples during Playback Period
   4-6. Process Examples during Moving Image Recording Period
5. Transition Example of Display State
6. Modification Examples Configuration of Imaging Apparatus As an embodiment of the present invention, the configuration of an imaging apparatus, for example, serving as a digital camera, will be described with reference to FIGS. 1A, 1B, and 2.

FIGS. 1A and 1B illustrate an external view of an imaging apparatus 1 according to the present example as viewed from the back side (user side) and front side (subject side) thereof. With the imaging apparatus 1, an imaging lens unit 20 and a flash emitting unit 15, and so forth are provided to the front side.

Also, operators used for user operations are formed on various portions such as the casing upper face, back side, and so forth. For example, there are provided a release operation key 5a, a dial operating portion 5b, a wide/tele operation key 5c, various types of operating keys 5d, a D-pad 5e, and so forth. The dial operating portion 5b is used for selection of an imaging mode or the like, for example. Operations such as a menu instruction, a playback instruction, an exposure correction instruction, and so forth are available through the operating keys 5d. The D-pad 5e is used for various types of operations including selection/determination of an operation menu item to be displayed on a display panel 6, for example.

With the imaging apparatus 1, as shown in FIG. 1A, a main display panel 6M made up of a liquid crystal panel, an organic electroluminescence (EL) panel, or the like is provided to the back side, and as shown in FIG. 1B, a front display panel 6F similarly made up of a liquid crystal panel, an organic EL panel, or the like is provided to the front side.

The main display panel 6M and the front display panel 6F have, for example, the same screen size, and are provided so as to occupy a relatively wide area of the casing back and the casing front respectively. With the main display panel 6M, basically, during the monitoring period (when awaiting a suitable timing in the imaging mode) display of a monitoring image (through image) where a user is a subject is executed, whereby the user can confirm a subject scenery serving as an imaging target. Also, with a playback mode, display of a playback image or thumbnail images is executed in accordance with the operation by the user.

On the other hand, the front display panel 6F is directed to the subject side to execute display. With the front display panel 6F as well, an arrangement is made wherein display of a monitoring image or the like is executed, whereby a person serving as the subject side can view display content thereof, which will be described later.

A configuration example of such an imaging apparatus 1 will be described with reference to FIG. 2. As shown in FIG. 2, the imaging apparatus 1 includes an imaging system 2, a control system 3, a camera digital signal processor (DSP) 4, an operating unit 5, a main display panel 6M, a front display panel 6F, a display controller 7, an external interface 8, SDRAM (Synchronous Dynamic Random Access Memory) 9, and a medium interface 10.

The imaging system 2 is a portion to execute an imaging operation, and includes a lens mechanical unit 21, a diaphragm/ND filter mechanism 22, an imaging device unit 23, an analog signal processing unit 24, an A/D conversion unit 25, a lens driving unit 26, a lens position detecting unit 27, a timing generating circuit 28, a blurring detecting unit 13, an emission driving unit 14, a flash emitting unit 15, a lens driving driver 17, a diaphragm/ND driving driver 18, and an imaging device driver 19.

The incident light from a subject is guided to the imaging device unit 23 via the lens mechanical unit 21 and the diaphragm/ND filter mechanism 22. The lens mechanical unit 21 is the internal configuration of the imaging lens unit 20 in FIG. 1B, and includes multiple optical lens groups such as a cover lens, a focus lens, a zoom lens, and so forth. Also, the lens driving unit 26 is a transfer mechanism to transfer the focus lens or zoom lens in the optical axis direction. The lens driving unit 26 to which driving power is applied by the lens driving driver 17 transfers the focus lens or zoom lens. A later-described CPU (Central Processing Unit) 31 controls the lens driving driver 17, thereby executing focus control or zoom operation.

The diaphragm/ND filter mechanism 22 includes a diaphragm mechanism, and an ND filter mechanism to attenuate an incident light quantity by being inserted into the lens optical system, and executes optical quantity adjustment. The diaphragm/ND filter mechanism 22 executes optical quantity adjustment by opening/closing a diaphragm mechanism. Also, the diaphragm/ND driving driver 18 takes an ND filter in and out as to the optical axis of incident light, thereby adjusting an incident light quantity. The CPU 31 controls the diaphragm/ND driving driver 18 to drive the diaphragm mechanism or ND filter, whereby incident light quantity control (exposure adjustment control) can be executed.

The luminous flux from the subject passes through the lens mechanical unit 21 and the diaphragm/ND filter mechanism 22, whereby a subject image is formed on the imaging device unit 23. The imaging device unit 23 subjects the formed subject image to photoelectric conversion to output the captured image signal corresponding to the subject image. The imaging device unit 23 includes a rectangular imaging region made up of multiple pixels, and sequentially outputs, to the analog signal processing unit 24, the image signal that is the analog signal corresponding to the charge accumulated in each pixel in increments of pixels. For example, a CCD (Charge Coupled Device) sensor array, a CMOS (Complementary Metal Oxide Semiconductor) sensor array, or the like is used as the imaging device unit 23.

The analog signal processing unit 24 internally includes a CDS (Correlation Double Sampling) circuit, an AGC (Automatic Gain Control) circuit, and so forth, and subjects the image signal input from the imaging device unit 23 to a predetermined analog process. The A/D conversion unit 25 converts the analog signal processed as the analog signal processing unit 24 into a digital signal, and supplies this to the camera DSP 4.

The timing generating circuit 28, which is controlled by the CPU 31, controls the timing of various operations of the imaging device unit 23, analog signal processing unit 24, and A/D conversion unit 25.

Specifically, the timing generating circuit 28 supplies, in order to control the imaging operation timing of the imaging device unit 23, a timing signal for exposure/charge readout, a timing signal serving as an electric shutter function, a transfer clock, a synchronizing signal according to a frame rate, and so forth to the imaging device unit 23 via the imaging device driver 19. Also, the timing generating circuit 28 also supplies the above various timing signals to the analog signal processing unit 24 so that the analog signal processing unit 24 can execute a process in sync with transfer of an image signal at the imaging device unit 23.

The CPU 31 executes control of each timing signal generated by the timing generating circuit 28, whereby change of the frame rate of a captured image, and electric shutter control (exposure time variable control within a frame) can be executed. Also, the CPU 31 provides a gain control signal to the analog signal processing unit 24 via the timing generating circuit 28, whereby gain variable control of a captured image signal can be executed.

The blurring detecting unit 13 detects a shaking quantity, and the motion amount of the imaging apparatus 1 itself. The blurring detecting unit 13 is configured of, for example, an acceleration sensor, a vibration sensor, or the like, and supplies detection information serving as a blurring quantity to the CPU 31.

The flash emitting unit 15 is driven by the emission driving unit 14 so as to emit flash light. The CPU 31 instructs the emission driving unit 14 to execute flash emission at a predetermined timing such as the user's operation or the like, whereby the flash emitting unit 15 can be emitted.

The camera DSP 4 subjects the captured image signal to be input from the A/D conversion unit 25 of the imaging system 2 to various types of digital signal processes. With the camera DSP 4, processing functions, for example as shown in the drawing, such as the image signal processing unit 41, compression/decompression processing unit 42, SDRAM controller 43, image analyzing unit 44, and so forth are realized with the internal hardware and software.

The image signal processing unit 41 executes a process as to an input captured image signal. For example, the image signal processing unit 41 executes an autofocus (AF) process, an auto exposure (AE) process, or the like as an operation process used for driving control of the imaging system 2 using a captured image signal, and also executes an auto white balance (AWB) process or the like as a process as to a captured image signal itself to be input.

For example, as the autofocus process, the image signal processing unit 41 executes contrast detection as to an input captured image signal, and transmits the detection information to the CPU 31. Various types of control methods have been used as autofocus control methods, but with a technique referred to as "contrast AF", contrast detection is executed regarding the captured image signal at each point in time while moving the focus lens forcibly, thereby determining the position of the focus lens in the optimal contrast state. That is to say, the CPU 31 executes control to confirm the contrast detection value detected at the image signal processing unit 41 while executing the movement control of the focus lens prior to an imaging operation, and to determine a position in the optimal contrast state as a focus optimal position.

Also, as focus control during imaging a detection method referred to as so-called wobbling AF can be executed. The CPU 31 confirms the contrast detection value detected at the image signal processing unit 41 while moving the position of the focus lens by swaying the focus lens minutely forward and backward all the time during an imaging operation. The optimal position of the focus lens changes depending to the state of a subject, but contrast detection is executed while changing the focus lens minutely forward and backward, whereby change in the format control direction can be determined according to change in the subject. Thus, autofocus can be executed while tracking the state of a subject.

Note that, with a transfer mechanism of the lens driving unit 26, an address is assigned thereto for each of transfer positions, and a lens position is distinguished with the transfer position address thereof.

The lens position detecting unit 27 distinguishes the address of the focus lens serving as the current lens position of the focus lens, thereby calculating distance to a subject in a focused state, and accordingly, this can be supplied to the CPU 31 as distance information. Thus, the CPU 31 can distinguish distance to a principal subject in a focused state.

As the auto exposure process executed by the image signal processing unit 41 of the camera DSP 4, for example, calculation of subject luminance is executed. For example, the average luminance of input captured image signals is calculated, and this is supplied to the CPU 31 as subject luminance information, i.e., exposure quantity information.

As calculation of average luminance, various types of methods can be conceived, for example, such as calculation of the average value regarding the luminance signal values of all the pixels of the captured image data of one frame, calculation of the average value of luminance signal values wherein weight is provided to the center portion of an image, or the like.

The CPU 31 can execute automatic exposure control based on this exposure quantity information, i.e., can execute exposure adjustment in accordance with electronic shutter control at the diaphragm mechanism, ND filter, or imaging device unit 23, or gain control as to the analog signal processing unit 24.

The image signal processing unit 41 of the camera DSP 4 executes automatic white balance, gamma correction, an edge enhancement process, a shaking correction process, or the like as the signal process of the captured image signal itself in addition to a signal generating process used for autofocus operation or auto exposure operation.

The compression/decompression processing unit 42 of the camera DSP 4 executes a compression process as to the captured image signal, or a decompression process as to the compressed image data. For example, the compression/decompression processing unit 42 executes a compression process/decompression process using a method such as JPEG (Joint Photographic Experts Group), MPEG (Moving Picture Experts Group), or the like.

The SDRAM controller 43 executes writing/readout as to the SDRAM 9. The SDRAM 9 is used for temporary storing of the captured image signal input from the imaging system 2, storing at the process stage at the image processing unit 41 or compression/decompression processing unit 42, ensuring of a work region, storing of information obtained at the information analyzing unit 44, or the like, and the SDRAM controller 43 executes writing/readout of such data as to the SDRAM 9.

The image analyzing unit 44 executes image analysis, for example, regarding the captured image data processed at the image signal processing unit 41, and executes various types of image recognition. In the case of the present example, the image analyzing unit 44 executes a recognition process of a person or face included in a subject image. Also, in the case of recognizing a person's face, the image analyzing unit 44 executes a recognition process for facial orientation, sight direction, or the like in some cases. Further, the image analyzing unit 44 detects various types of information that can be recognized by image analysis, such as the size of relative motion between the imaging apparatus 1 and a subject, or the like in some cases.

The control system 3 includes the CPU 31, RAM 32, flash ROM 33, and clock circuit 34. Each unit of the control system 3, camera DSP 4, and each unit of the imaging system 2, display controller 7, external interface 8, and medium interface 10 can communicate image data and control information mutually via the system bus.

The CPU 31 controls the whole of the imaging apparatus 1. Specifically, the CPU 31 executes various types of operation processes, and exchange of a control signal or the like as to each unit based on the program stored in the internal ROM or the like, and the user's operation by the operating unit 5, thereby causing each unit to execute a predetermined operation. Particularly, the CPU 31 executes display control at the main display panel 6M, and a control process used for display operation of a later-described front display panel 6F, or the like.

The RAM (Random Access Memory) 32 is used for temporary storing of the captured image signal (image data of each frame) processed at the camera DSP 4, and storing of information according to each type of process of the CPU 31.

The flash ROM 33 is used for storing of image data (imaged as a still image or moving image by the user) serving as a captured image, or storing of information requested for being saved in a nonvolatile manner. The flash ROM 33 may store control software programs of the imaging apparatus 1, the setting data of the camera, and so forth.

The clock circuit 34 counts the current date and time information (year, month, day, hour, minute, second).

The operating unit 5 is configured of various types of operators (5a through 5e, etc.) shown in FIGS. 1A and 1B, and a signal generating unit based on the operation thereof. The user's operation information by various types of operators is transmitted from the operating unit 5 to the CPU 31. Note that the operating unit 5 may be configured so as to allow the user to perform touch panel operations in addition to operations by the operators. For example, an arrangement may be made wherein a touch sensor is provided to the main display panel 6M, and operation input is performed by the user's touch operation as to screen display.

The display controller 7 controls the main display panel 6M and the front display panel 6F to execute a predetermined display operation based on the control of the CPU 31.

As a display operation at the main display panel 6M, monitoring display (so-called through image display), playback image display read out from the recording medium 90 or flash ROM, operation menu display, various types of icon display, point-in-time display, or the like is executed. Also, as a display operation at the front display panel 6F, monitoring display, or playback image display is executed.

The medium interface 10 executes readout/writing of data as to the recording medium 90 such as a memory card (card-shaped removable memory) set within the imaging apparatus 1, or the like based on the control of the CPU 31. For example, the medium interface 10 executes an operation to record still image data or moving image data serving as an imaged result in the recording medium 90. Also, the medium interface 10 executes an operation to read out image data from the recording medium 90 at the time of the playback mode.

Note that the portable memory card is exemplified as the recording medium 90 here, but another type of recording medium may be used as long as this medium can be used for recording image data serving as a still image or moving image to be kept as an imaged result. For example, a portable disk medium such as an optical disc or the like may be used, or an HDD (Hard Disk Drive) may be installed to record image data.

The external interface 8 executes transmission/reception of various types of data as to an external apparatus via a predetermined cable in accordance with a signal standard, such as USB (Universal Serial Bus) or the like, for example. It goes without saying that an external interface according to another standard such as IEEE (Institute of Electrical and Electronics Engineers) 1394 or the like may be used regardless of the USB method.

Also, the external interface 8 may be configured by a wireless transmission method such as infrared transmission, short-distance wireless communication, or the like, instead of a cable transmission method.

The imaging apparatus 1 can execute data transmission/reception as to various types of equipment such as a personal computer or the like via the external interface 8. For example, captured image data can be transferred to an external apparatus.

Note that a proximity sensor 50 is shown in FIG. 2. Let us say that the proximity sensor 50 is a sensor to detect whether or not there is a person in front of the imaging apparatus 1 (subject side). For example, a pyroelectric sensor or the like can be employed. As described above, in the case that person detection is executed by the image analyzing process of the image analyzing unit 44, the proximity sensor 50 may not be provided, or person detection by image analysis, and detection by the proximity sensor 50 may be used together.

Operation Transition

The transition of the operation period of the imaging apparatus 1 of the present example will be described with reference to FIG. 3. The operation period is a period accompanying an imaging operation or recording operation.

The operation period of the imaging apparatus 1 is changed to the monitoring period, recording period, preview period, and playback period according to the user's operation or the like. Note that, in reality, there are other operation states such as a period wherein communication with an external apparatus is executed, but description thereof will be omitted for the sake of simplifying explanation.

When the imaging apparatus 1 is, for example, powered on, the monitoring operation is started. Note that, there are cases where the imaging apparatus 1 goes to a playback operation state at the time of power-on, such as a case where the user performs a playback operation from a power-off state, or the like.

The monitoring period is an operation period used for executing imaging by the imaging system 2. In the case that the user commonly uses the imaging apparatus 1 to execute imaging of a still image, first, this monitoring operation is executed.

With this monitoring period, a subject image (through image) is displayed on the main display panel 6M. Specifically, the CPU 31 controls the imaging system 2 and camera DSP 4 to execute an operation for imaging during the monitoring period. Subsequently, the CPU 31 stores the captured image data for each frame supplied from the camera DSP 4, for example, in the RAM 32. Subsequently, the CPU 31 transfers the captured image data for each frame to the display controller 7, and controls the main display panel 6M to execute monitoring display. At this time there is a case where the front display panel 6F is also controlled to execute monitoring display, which will be described later.

During this monitoring period, the user selects a subject, or awaits a suitable timing to take a picture, while viewing the display of the main display panel 6M.

During the monitoring period, upon the user pressing the release operation key 5a, i.e., upon the user performing a shutter operation, an operation serving as the recording period is started.

The CPU 31 executes a process to store the captured image data of one frame to be imaged at the timing of this release operation as still image data. Specifically, the CPU 31 transfers the captured image data captured at such timing to the medium interface 10 to record this in the recording medium 90.

Note that a recording operation according to a release operation may be executed not as to the recording medium 90 but as to the flash ROM 33. Also, an operation system may be employed wherein recording is usually executed as to the recording medium, but in the case that the recording medium 90 is not mounted, recording is executed as to the flash ROM 33. This recording period is temporally a momentary period immediately after a release operation as viewed from the user, but display control is executed regarding the main display panel 6M and the front display panel 6F during such a period as described later.

For example, a certain period of time immediately after a recording operation according to a release operation will be referred to as the preview period. The preview period is a period wherein the image recorded in the immediately previous recording operation is displayed on the main display panel 6M, i.e., a period wherein the user is allowed to confirm the imaged still image immediately after.

In the case that the preview period is limited to a certain period of time, a period of two seconds through several seconds or so, for example, is provided as the preview period. The CPU 31 controls the main display panel 6M and the front display panel 6F to display the recorded still image data during this period.

Note that, as an internal process of the imaging apparatus 1, there is a case where the process of the recording period and the process of the preview period are overlapped temporally. An example of this case is a case where time has to be taken for the recording process, and the preview process is started before recording is completed. In such a case, it is better to understand that internally, transition from the recording period to the preview period is not executed completely, but with regard to a display operation, transition form the recording period to the preview period is executed.

Upon predetermined time serving as the preview period having elapsed, the CPU 31 returns the operation state to the monitoring state, and executes operation control serving as the monitoring period. That is to say, the monitoring period, recording period, and preview period have changed, whereby a series of operations as imaging of a still image is executed.

Note that, with the imaging apparatus 1, imaging of a moving image can be executed, but in the case of a moving image, the recording period continues during a period from the start to the end of imaging of the moving image thereof. Also, in this case, no preview period is provided. Description will be made later regarding recording of a moving image.

In the case that the user has performed an operation to instruct a playback operation, the imaging apparatus 1 proceeds to a playback operation state (playback period). During the playback period, an operation to play the image recorded in the recording medium 90 or flash ROM 33 by imaging or the like is executed.

The CPU 31 reads out the image recorded in the recording medium 90 or flash ROM 33 in response to the user's operation, and instructs the display controller 7 to display thumbnail images or a playback image on the main display panel 6M. Also, the playback image is displayed on the front display panel 6F in some cases.

Screen Display Examples of both Display Panel Units

Screen display examples to be displayed on the main display panel 6M and the front display panel 6F of the imaging apparatus 1 according to the present example will be described with reference to FIGS. 4A through 5C.

Figure 4A:
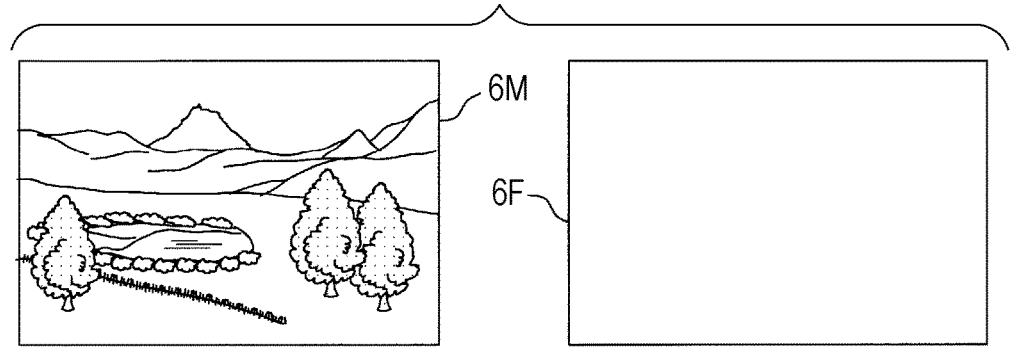
FIGS. 4A through 4C are explanatory diagrams of an image display example of the imaging apparatus according to the embodiment.

FIG. 4A illustrates a state in which image display is executed on the main display panel 6M, and display is off on the front display panel 6F. The image to be displayed is a monitoring image (through image) during the monitoring period, a recording image (image recorded and processed as a still image) during the recording period, or a preview image (image recorded and processed as a still image immediately before) during the preview period, or the like. Also, a playback image during the playback period is the image to be displayed in some cases.

The playback image assumes a playback image of an image imaged in the past and recorded in the recording medium 90 or flash ROM 33, but may be an image stored in the imaging apparatus 1 beforehand. An example of this case is a case where image data is prepared so as to be displayed when no monitoring image is displayed on the front display panel 6F, and is stored as a preset image in the flash ROM 33 or the like beforehand, and the preset image data thereof is read out and displayed.

Further, it can be conceived that the playback image is not restricted to image data serving as a so-called captured image, text data, animation data, computer graphics data, or the like is recorded in the recording medium 90 or flash ROM 33, and such data is played and displayed. That is to say, the play back image includes any kind of image that can be displayed.

Figure 4B:
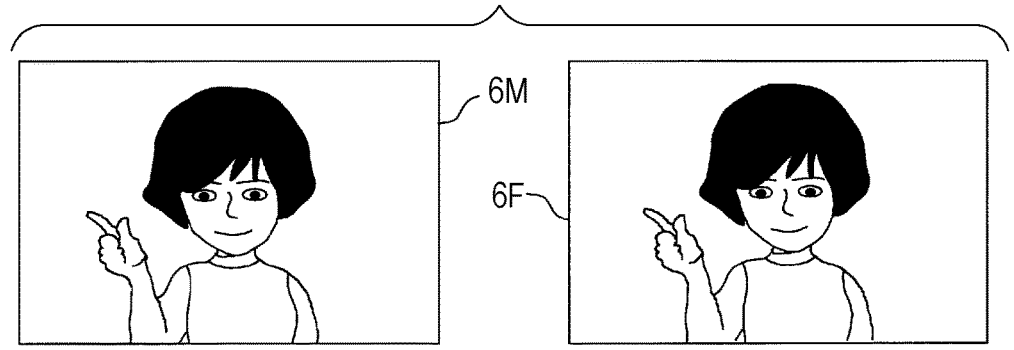

FIG. 4B illustrates a state in which image display such as a monitoring image, playback image, or the like is executed on the main display panel 6M, and the same image is also displayed on the front display panel 6F.

Figure 4C:
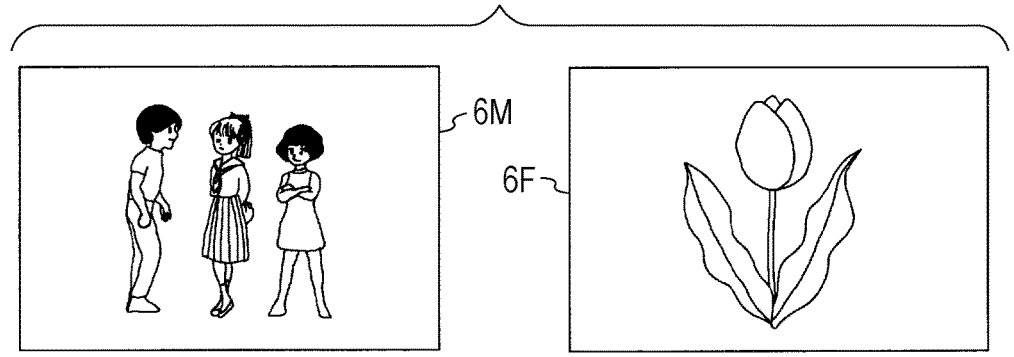

FIG. 4C illustrates a state in which a different image is displayed on the main display panel 6M and the front display panel 6F.

Figure 5A:
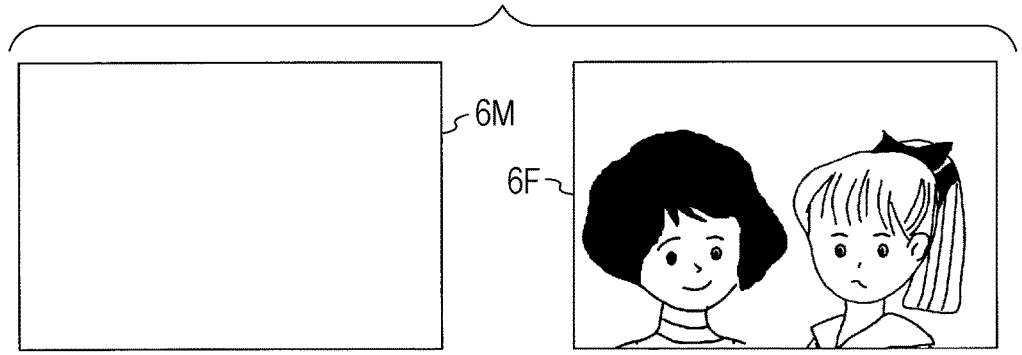
FIGS. 5A through 5C are explanatory diagrams of an image display example of the imaging apparatus according to the embodiment.

FIG. 5A is an example wherein display is off on the main display panel 6M, and display of a monitoring image or the like is executed on the front display panel 6F.

Figure 5B:
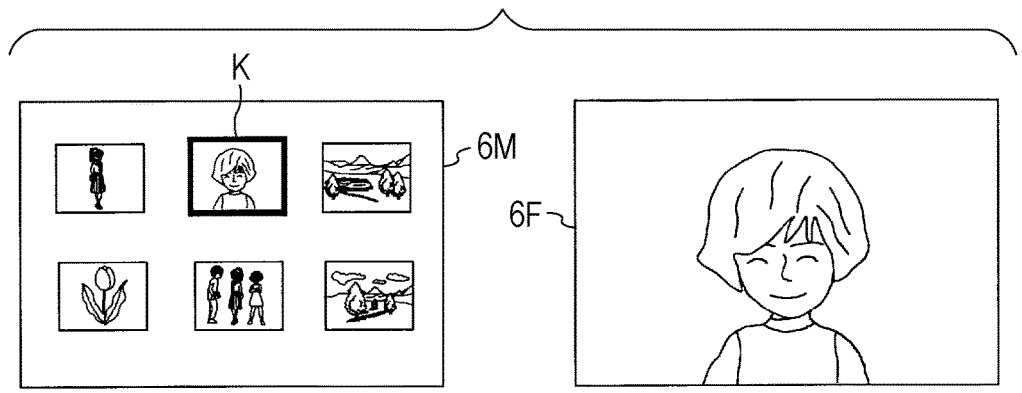

FIG. 5B illustrates, as a display example of the playback period, a state in which list display by the thumbnail images of the playback image is executed on the main display panel 6M, and on the other hand, with the front display panel 6F, a playback image under selection by a cursor K within a thumbnail image is displayed.

Figure 5C:
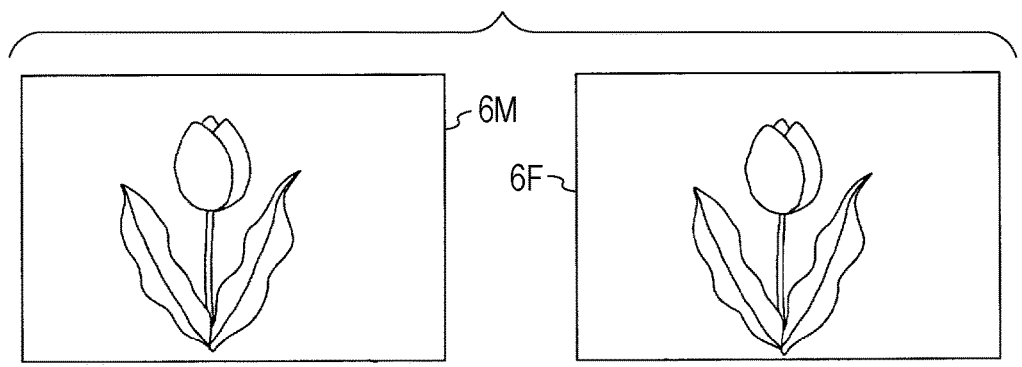

FIG. 5C illustrates, as a display example of the playback period, a state in which display of a playback image is executed on the main display panel 6M, and the same playback image is also displayed on the front display panel 6F.

The above is an example of display state examples, but with the present example, suitable display control is executed on the main display panel 6M and the front display panel 6F for each of the operation periods, and accordingly, various display states are realized.

The CPU 31 executes display control regarding the main display panel 6M and the front display panel 6F according to the display purpose and estimated situation at each of the operation periods, and as a result thereof, as described above, the display states of both display panels 6M and 6F vary. Various descriptions will be made next regarding the transition of the operation period, and an operation control example at each period.

Display Control Examples 4-1. Process Examples to Execute Transition of Operation Period First, an overall operation control example accompanying the transition of the operation period of the CPU 31 will be described with reference to FIG. 6. Now, an example will be described wherein upon the imaging apparatus 1 being powered on, and being activated, first an operation serving as the monitoring period is executed (example corresponding to FIG. 3).

Figure 6:
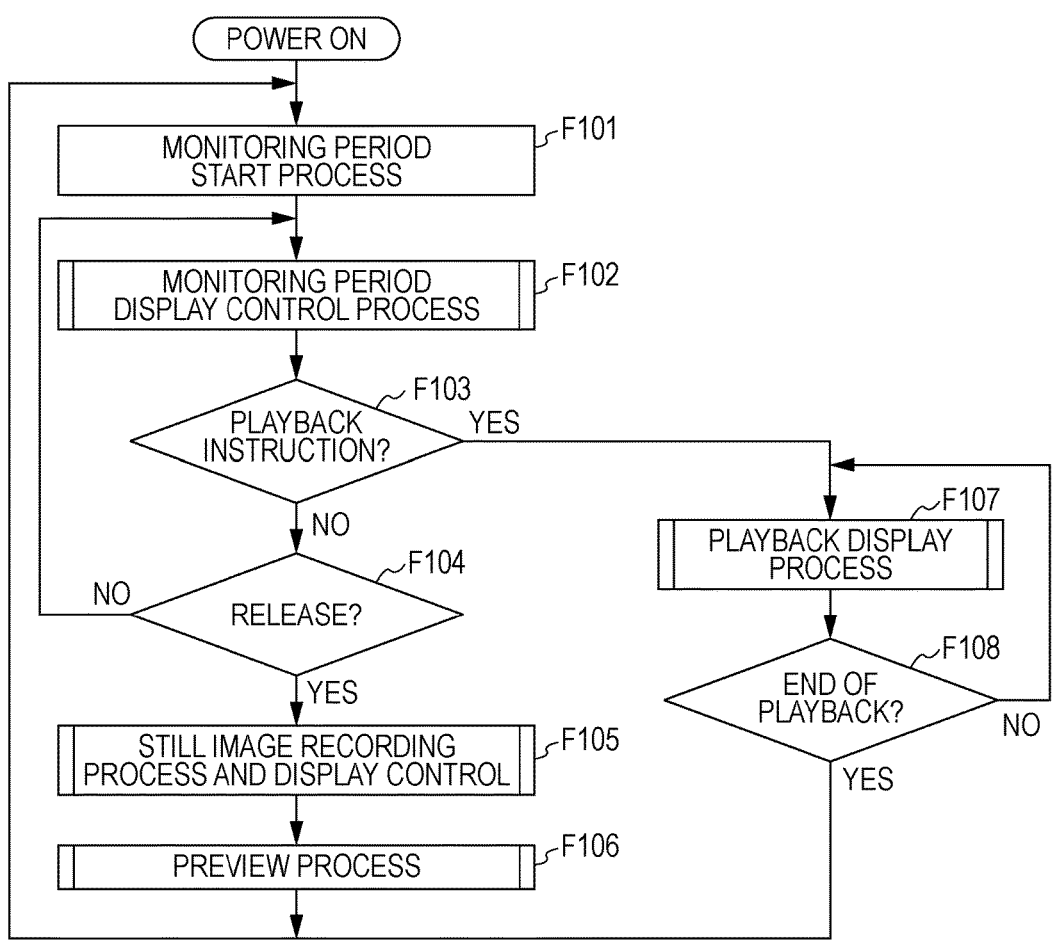
FIG. 6 is a flowchart of a control process example to execute the transition of each of operation periods according to the embodiment.

Upon the imaging apparatus 1 being powered on, the CPU 31 executes a monitoring period start process in step F101 in FIG. 6. Specifically, the CPU 31 executes a predetermined activation process, and instructs the imaging system 2 and camera DSP 4 to start an imaging operation. Thus, each frame data serving as a monitoring image to be obtained at the processes of the imaging system 2 and camera DSP 4 is captured.

In step F102, the CPU 31 executes a display control process serving as the monitoring period. During the monitoring period, basically, the CPU 31 controls the main display panel 6F to display a monitoring image on the front display panel 6F. Also, the CPU 31 controls the front display panel 6F to display a monitoring image in some cases. A specific process example in step F102 will be described with reference to FIGS. 7A, 7B, and so forth.

The monitoring period is a period wherein the user determines a subject or picture composition while viewing a monitoring image, or aims for release timing. Also, the user can also switch the operation state of the imaging apparatus 1 from a monitoring state to a playback operation.

Therefore, in step F103, the CPU 31 monitors the user's playback instruction operation, and in step F104 monitors the user's release operation.

Upon detecting that the user has performed the operation of the release operation key 5a, in step F105 the CPU 31 proceeds to the recording period to execute a process to be performed, i.e., a still image recording process and display control.

The CPU 31 executes, as the still image recording process, a process to store the captured image data of one frame to be imaged at the timing of a release operation as still image data. That is to say, the CPU 31 transfers the captured image data captured at the timing thereof to the medium interface 10 to record this in the recording medium 90 or flash ROM 33.

Also, this recording period is a very short period of time immediately after a release operation as viewed from the user, during which recording period the CPU 31 executes display control different from the monitoring period regarding the main display panel 6M and the front display panel 6F. A specific example will be described later.

Figure 3:
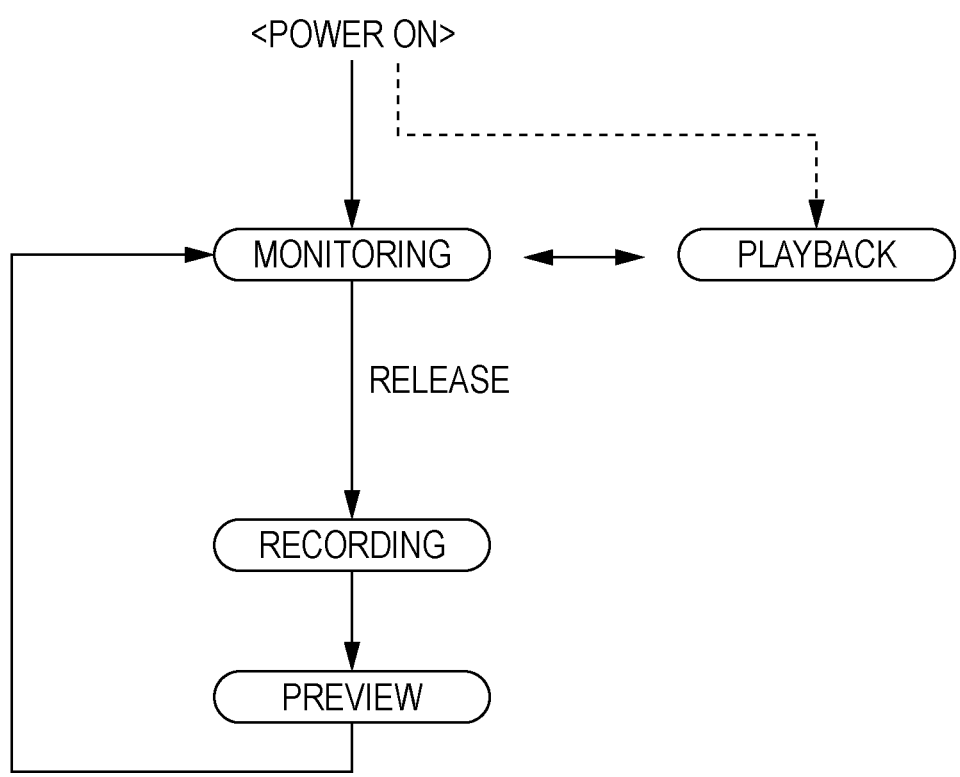
FIG. 3 is an explanatory diagram of the operation transition of the imaging apparatus according to the embodiment.

As described in FIG. 3, for example, a certain period of time immediately after a recording operation corresponding to a release operation is used as the preview period. The CPU 31 executes, as the process of the preview period in step F106, a process to display an image recorded in an immediately previous recording operation, but in this case as well, executes display control regarding the main display panel 6M and the front display panel 6F as display control different from the recording period and the monitoring period. After the preview process, the CPU 31 returns to step F101 to execute the start process of the monitoring period again, and in step F102 executes display operation control serving as the monitoring period.

In the case that the user has performed a playback instruction operation during the monitoring period, the CPU 31 proceeds to step F107 to execute a playback display process. That is to say, the CPU 31 executes control of the readout process of the image data from the recording medium 90 by the medium interface 10, or the readout process of the image data from the flash ROM 33. During this playback period, the CPU 31 executes a later-described display control process for the playback period to execute display control regarding the main display panel 6M and the front display panel 6F, which will be described later. In the case that the playback operation is ended according to the user's operation or the like, the CPU 31 returns fro step F108 to F101 to proceed to the process of the monitoring period again.

Note that, though not shown in FIG. 6, the CPU 31 executes a power-off process according to the user's operation or predetermined time elapsed in a non-operating state or the like.

Process Examples during Monitoring Period

According to the process in FIG. 6, the imaging apparatus 1 executes, according to the user's operation or the like, as the operation state thereof, transition of the monitoring period, recording period, preview period, and playback period.

With the present example, according to the transition of these operation periods, the CPU 31 executes switching of the display states and display contents of the main display panel 6M and the front display panel 6F. A specific process example for each of the operation periods will be described next.

First, a process example during the monitoring period will be described with reference to FIGS. 7A and 7B, i.e., a process example of the CPU 31 as step F102 in FIG. 6.

Figure 7A:
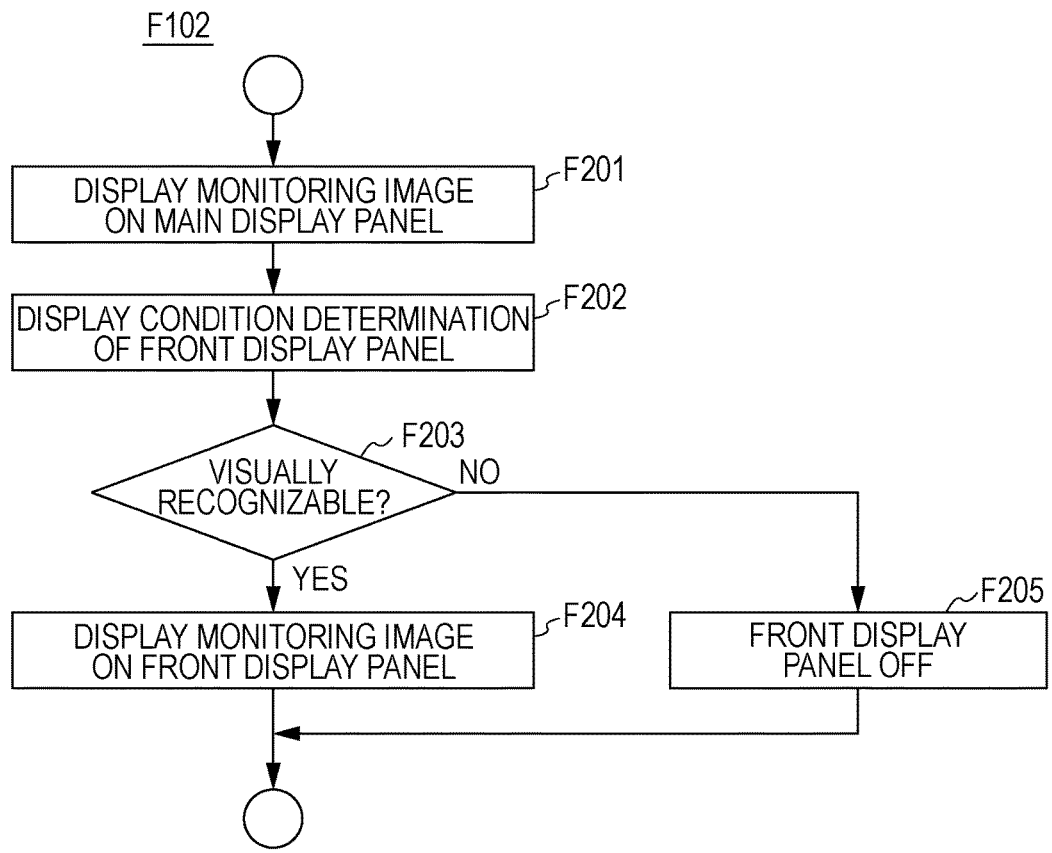
FIGS. 7A and 7B are flowcharts of a process example of a monitoring period according to the embodiment.

With the example in FIG. 7A, first in step F201, the CPU 31 controls the main display panel 6M to display a monitoring image. Thus, a monitoring image serving as a subject image (through image) obtained at the operations of the imaging system 2 and camera DSP 4 is displayed on the main display panel 6M, whereby the user can perform selection of a subject or picture composition, or the like while viewing the monitoring image.

At this time, the CPU 31 executes steps F202 through F205 as the display control of the front display panel 6F.

First, in step F202, the CPU 31 executes condition determination regarding display of the front display panel 6F. This is the determination process of visual recognition possibility conditions regarding the front display panel 6F. "Visual recognition possibility" means the possibility that display of the front display panel 6F will be executed effectively.

For example, it is assumed that for a visual recognition possibility to be real, there has to be a person to view the front display panel 6F, that the front display panel 6F is in a normally recognizable state in the case that the person attempts to view the front display panel 6F, that the person intends to view the front display panel 6F, and so forth.

The determination of this visual recognition probability can be executed, for example, as a determination process regarding whether or not there is a person at the subject side, a determination process of the imaging mode, a determination process regarding internal detection information, or a determination process regarding the image analyzing process results of a captured image signal.

Subsequently, upon determining that there is a visual recognition possibility, the CPU 31 advances the process from step F203 to step F204 to execute display control of a monitoring image on the front display panel 6F. In this case, as shown in FIG. 4B, in the same way as with the main display panel 6M, the monitoring image is also displayed on the front display panel 6F.

On the other hand, upon determining that there is no visual recognition possibility, the CPU 31 advances the process from step F203 to step F205 to execute control for turning off the display of the front display panel 6F. For example, the CPU 31 changes the front display panel 6F to a non-displaying state, or executes power-off control regarding the front display panel 6F. In this case, as shown in FIG. 4A, the monitoring image is displayed on the main display panel 6M alone.

If the conditions assumed regarding a visual recognition possibility are satisfied by the CPU 31 executing the process in FIG. 7A in step F102 in FIG. 6, display of the monitoring image is executed on the front display panel 6F at the process in step F204.

During the monitoring period, it is suitable to display a monitoring image on the front display panel 6F. For example, in the case that the subject is a person, the person thereof can confirm his facial expression or pose or the like to be imaged while viewing the display of the front display panel 6F.

However, this is effective only when the person is at the subject side. For example, when an user attempts to image scenery where there is no person, there is no person viewing the display of the front display panel 6F in most cases.

Also, even if there is a person as a subject, the person thereof may have difficulty in actually viewing the display due to the surrounding brightness or the like in some cases. Further, even if there is a person as a subject, there may be a situation in which the person thereof is not viewing the display of the front display panel 6F, or has difficulty in viewing the display of the front display panel 6F.

In such cases, there is no meaning for a monitoring image to be displayed on the front display panel 6F, and it is suitable to realize power saving by turning off the front display panel 6F, and accordingly, in such cases, in step F205 the CPU 31 turns off the front display panel 6F.

That is to say, an arrangement is made wherein, in the case that determination is made according to the condition determination that the display of the front display panel 6F is effective, a monitoring image is displayed on the front display panel 6F, whereby a subject person or the like can confirm a subject (e.g., his own facial expression or pose). On the other hand, in the case that determination is made that the display of the front display panel 6F is ineffective, the display of the front display panel 6F is turned off. That is to say, wasteful display which nobody views, and wasteful display with poor visibility, are not executed, thereby realizing conservation of power.

The condition determination of a visual recognition possibility will be exemplified below. Determination according to the imaging mode is one example of a technique for condition determination.

The imaging mode is a mode that the user selects so as to perform imaging in a suitable state under various situations, such as a night view mode, night view and person mode, portrait mode, scenery mode, "soft snap" mode, snow mode, beach mode, high-speed shutter mode, high-sensitivity mode, smile shutter mode, and so forth.

With each of these imaging modes, suitable shutter speed, suitable exposure setting, suitable signal gain setting as to a captured image signal, suitable signal process settings such as edge enhancement and color process, and so forth have already been determined, and these settings can be selected by the user, for example, according to the operations of the dial operating portion 5b shown in FIG. 1A.

The night view mode is an imaging mode wherein imaging is executed with settings suitable for night view imaging. The night view and person mode is an imaging mode wherein imaging is executed with settings capable of imaging the night view of the back and the facial expression of a person with vivid clarity.

The portrait mode is an imaging mode wherein imaging is executed with settings suitable for person imaging.

The scenery mode is an imaging mode wherein imaging is executed with settings suitable for scenery imaging.

The "soft snap" mode is an imaging mode wherein imaging is executed with settings to give a viewer the impression that the texture of the skin of a person is bright and soft.

The high-speed shutter mode is an imaging mode wherein imaging is executed with settings suitable for a moving subject.

The high-sensitivity mode is an imaging mode wherein imaging is executed with natural mood using neither dark scenes nor flash.

The smile shutter mode is an imaging mode wherein a shutter process (release) is automatically executed when the subject person smiles.

Though an imaging mode used for executing an imaging process suitable for such an imaging situation is selected by the user, the CPU 31 executes imaging process control according to the imaging mode settings with the stage of still image imaging from the monitoring period to the recording period. That is to say, the CPU 31 executes various types of parameter instructions as to the imaging system 2 and camera DSP 4 according to the imaging mode selected by the operation of the dial operating portion 5*b*. For example, an instruction is executed, such as the above shutter speed settings, exposure settings, signal process settings, or the like.

In the case that such an imaging mode is used, for example, for the condition determination in step F202 in FIG. 7A, determination is made whether or not the current imaging mode is a predetermined imaging mode determined beforehand. That is to say, the current surrounding situation, a subject serving as a target, or the like is assumed according to the imaging mode.

For example, let us say that, of the above imaging modes, predetermined imaging modes whereby a situation suitable for display regarding the front display panel 6F can be assumed are the night view and person mode, portrait mode, "soft snap" mode, smiling shutter mode, and the like. That is to say, the CPU 31 has determined these imaging modes as imaging modes corresponding to the predetermined imaging modes at the time of condition determination.

These imaging modes are selected in the case of having the objective of imaging of a person, and accordingly, there is a high possibility that a person is included as a subject. That is to say, there is a high possibility that there is a person who can view the display of the front display panel 6F as a subject.

Therefore, the CPU 31 determines that if the imaging mode is one of the night view and person mode, portrait mode, "soft snap" mode, and smiling shutter mode, the display conditions of the front display panel 6F are satisfied.

In the case that the imaging mode is an imaging mode other than those, i.e., the night view mode, scenery mode, high-speed shutter mode, or high-sensitivity mode, the imaging mode is assumed to be selected in the case of having no objective of imaging of a person, or the visibility of the front display panel 6F is assumed to be in a poor state.

For example, the night view mode and the scenery mode are intended for scenery imaging, and a situation can be assumed wherein no person is included in the subject, or even if a person is included, the person thereof has no primary role within the image. Also, in the case of the night view mode or high-sensitivity mode, even if there is a person in front, a monitoring image displayed at the time of imaging a dark scene on the front display panel 6F would result in poor visibility from the person in front thereof.

Also, a subject in the high-speed shutter mode is a subject in motion. For example, even if a person is the subject, the person is in a situation such as participating in a sporting event, is dancing, or the like, and accordingly, the person thereof is in no situation to carefully view the front display panel 6F.

That is to say, in the case of these imaging modes, a situation is assumed wherein there is no person in front, or even if there is a person in front, the front display panel 6F is displayed with poor visibility, or the person thereof is not in a state to view the front display panel 6F.

Therefore, in the case that the imaging mode is one of the night view mode, scenery mode, high-speed shutter mode, and high-sensitivity mode, the CPU 31 determines with the condition determination that the conditions of the display of the front display panel 6F are not satisfied.

Note that the above modes are examples, in addition to those, an evening view mode wherein imaging is executed with settings suitable for evening view imaging, a macro mode suitable for closeup of subjects such as plants, insects, or the like, a firework mode suitable for imaging of fireworks, an underwater mode suitable for imaging under water, or the like, is provided in some cases. Also, a snow mode wherein imaging is executed with settings capable of expressing ski slopes and silvery snow of snow-covered landscapes as they appear to the human eye, a beach mode wherein imaging is executed with settings whereby the blue of the sea and sky is highlighted, or the like is provided in some cases.

In these cases as well, it should be set beforehand how to perform condition determination (whether or not the imaging mode is included in the predetermined imaging modes to execute the display of the front display panel 6F) according to whether or not there is a person, the visibility of the display content of the front display panel 6F, and the situation of a person on the subject side.

Also, examples of condition determining techniques include determination by the user's setting, besides the above imaging modes. Now, let us say that the user's setting mentioned here is a setting state according to the user's operation other than the imaging mode setting, for example, such as flash emission setting, zoom position operation, or the like.

Determination is made for condition determination regarding whether or not the user setting state other than the current imaging mode is a setting state suitable for the display of the front display panel 6F.

The flash emission setting of the user's settings will be considered as follows. The flash emission setting is a setting wherein the user selects whether to execute flash emission (flash-on), whether not to execute flash emission (flash-off), or whether to automatically execute flash emission on/off (flash-auto). In this case, a case where the user sets flash-on is usually a situation in which the surroundings are dark. In the case of a dark situation, a monitoring image during the monitoring period is in a low luminance state, and accordingly, the visibility of the display of the front display panel 6F can be conceived to be poor.

Therefore, with regard to the flash emission setting, in the case of flash-on being set, the CPU 31 determines that the conditions as the visual recognition possibility of the front display panel 6F are not satisfied.

The zoom position operation setting of the user's settings will be considered as follows. The zoom position setting is a zoom position setting, for example, in the case of the user operating the wide/tele operating key 5*c* in FIG. 1A to perform a zoom operation.

For example, even if a person has been set as a subject, when the zoom position is at the tele side (telephoto)

exceeding a predetermined position, the subject person thereof can be assumed to be positioned far away from the imaging apparatus 1. It goes without saying that if the subject person is too far away from the imaging apparatus 1, the person thereof will have difficulty in viewing the display of the front display panel 6F suitably.

Therefore, in the case that the zoom position by the user's operation is a position in a telephoto state exceeding a predetermined position, the CPU 31 determines that the conditions as the visual recognition possibility of the front display panel 6F are not satisfied.

Note that description has been made so far regarding the flash emission setting, and a zoom position operation as the user's settings, but in addition to the above, a sensitivity setting, exposure setting, shaking correction on/off setting, special imaging setting, and the like are assumed as the user's settings. Each of these can also be conceived to be reflected on condition determination as whether or not a suitable situation (visual recognition possibility) is assumed regarding behavior wherein a subject person views the display of the front display panel 6F suitably.

Also, determination using internal detection information is an example of a condition determining technique. The internal detection information mentioned here is various types of camera detection information that the imaging apparatus 1 detects internally. The camera detection information mentioned here is information detected by the internal sensor of the imaging apparatus 1, information that the CPU 31 can recognize in accordance with the operation control of the imaging apparatus 1, e.g., external light quantity detection information used for flash control or exposure control, zoom position information, focus information, shaking detection information, subject distance information, or the like.

As condition determination, the CPU 31 determines whether or not the situation assumed from the currently obtained camera detection information is a setting state suitable for the display of the front display panel 6F.

An external light quantity can be detected from the luminance average value of captured image data, a weighted luminance average value obtained by applying weighting to a portion within a screen, or the like, and these are commonly used for automatic exposure control, flash emission control in the case of the flash emission setting is auto, or the like. These luminance values are calculated, for example, at the image signal processing unit 41 of the camera DSP 4, whereby the CPU 31 can obtain the information thereof.

Also, though not shown in FIG. 2, an arrangement may be made wherein an external light quantity sensor or the like is provided, and external light quantity is detected directly.

In the case that the external light quantity detected with these techniques is low, a situation can be assumed wherein even if a monitoring image or the like is displayed on the front display panel 6F, the luminance of the screen itself is low, and accordingly, no excellent visibility can be obtained. Also, when shooting against a bright background, where the external light quantity level is too high, a situation can be assumed wherein it will be difficult to visually recognize the display of the front display panel 6F suitably.

Therefore, in the case that the external light quantity is lower than a predetermined level, or determined to be shooting into bright light, the CPU 31 determines that the external light quantity is not in a situation suitable for image display on the front display panel 6F, i.e., determines that the conditions as the visual recognition possibility of the front display panel 6F are not satisfied.

With regard to the zoom position information, the CPU 31 drives and controls the zoom lens according to the user's operation, whereby the zoom position can be detected. Even if a person has been set as a subject, when the zoom position is in the tele side (telephoto) exceeding a predetermined position, the subject person thereof can be assumed to be positioned far away from the imaging apparatus 1. That is to say, the subject person can be assumed not to be capable of viewing the display of the front display panel 6F suitably.

Therefore, in the case that the zoom position is in the position of a telephoto state exceeding a predetermined position, the CPU 31 determines that the conditions as the visual recognition possibility of the front display panel 6F are not satisfied.

The subject distance information is the information of distance from the imaging apparatus 1 to a subject. The CPU 31 can obtain the subject distance information using the information from the lens position detecting unit 27 as described above. For example, even if a person has been set as a subject, in the case that determination can be made that the subject person thereof is in a position far away from the imaging apparatus 1, the subject person can be assumed not to be capable of viewing the display of the front display panel 6F suitably.

Therefore, in the case that the subject is detected to be in a position far away exceeding a predetermined position, based on the subject distance information, the CPU 31 determines that the conditions as the visual recognition possibility of the front display panel 6F are not satisfied.

The focus information is the determination information of a focused state used for a process for autofocus at the image signal processing unit 41. In the case of an image wherein a captured image signal is not in a focused state, the CPU 31 has difficulty in displaying a suitable monitoring image, i.e., an out-of-focus monitoring image is displayed. Therefore, in the case of an out-of-focus state, the CPU 31 determines that the conditions as the visual recognition possibility of the front display panel 6F are not satisfied. Note that this is effective condition determination in the case of displaying a monitoring image.

The blurring detection information is the detection information of shaking, and the motion of the imaging apparatus 1. The CPU 31 can obtain the blurring detection information, for example, as the information from the blurring detecting unit 13.

In the case that shaking is great, or in the case that the user is moving the imaging apparatus 1 to follow a moving subject, or the like, a person in the vicinity thereof has difficulty in visually recognizing the image on the front display panel 6F suitably. Therefore, in the case that determination is made that blurring or the motion of the imaging apparatus 1 is great, based on the blurring detection information, the CPU 31 determines that the conditions as the visual recognition possibility of the front display panel 6F are not satisfied.

Also, determination using image analysis information is an example of a condition determination technique. The image analysis information is information obtained by an image analyzing process that the image analyzing unit 44 executes. The image analyzing unit 44 executes the image analyzing process regarding the captured image data imaged at the imaging system 2 and captured in the camera DSP 4 during the monitoring period or the like. For example, the image analyzing unit 44 executes the image analyzing process regarding the image data of each frame processed at the image signal processing unit 41, or the image data of a frame extracted intermittently from the frames processed at the image signal processing unit 41.

Information of whether or not a person is included in a subject can be used for condition determination as the image analysis information. In this case, the image analyzing unit 44 determines whether or not an image to be recognized as a person is included in the captured image data serving as an analyzing target, i.e., determines whether or not an outline portion to be recognized as a person is included within an image. Subsequently, the image analyzing unit 44 supplies the image analysis result thereof to the CPU 31. Therefore, the CPU 31 can confirm whether or not presence of a person has been recognized as the image analysis result thereof.

In the case that presence of a person has been recognized, the CPU 31 determines that the conditions as the visual recognition possibility of the front display panel 6F are satisfied. Also, in the case that presence of a person has not been recognized, the CPU 31 determines that the conditions as the visual recognition possibility of the front display panel 6F are not satisfied.

According to such condition determination, for example, when the user is directing the imaging apparatus 1 to a person so as to be the subject during the monitoring period, a monitoring image is displayed on the front display panel 6F. Also, when aiming for a subject not including a person, such as scenery or the like, the display of the front display panel 6F is turned off.

Note that presence of a person who can view the display of the front display panel 6F has been confirmed according to image analysis, but instead of image analysis, condition determination may be executed by confirming the detection result of the proximity sensor 50 shown in FIG. 2. Also, both of the image analysis result and the detection result of the proximity sensor 50 may be confirmed.

Incidentally, detection of a face may be executed as person detection according to the image analysis. For example, the image analyzing unit 44 determines presence of an outline to be recognized as a face, and presence of a facial element such as the eyes, nose, mouth, or the like from captured image data, and determines whether or not a person's face serving as a subject is included in the captured image data.

Subsequently, in the case that presence of a person's face has been recognized as the image analysis result, the CPU 31 determines that the conditions as the visual recognition possibility of the front display panel 6F are satisfied. Also, in the case that presence of a person's face has not been recognized, the CPU 31 determines that the conditions as the visual recognition possibility of the front display panel 6F are not satisfied.

Thus, instead of determination of the whole of a person's body, the presence of a person in front may be confirmed by determination of a face.

Various types of image recognition results can be obtained by other than person recognition and face recognition depending on the image analyzing process at the image analyzing unit 44. For example, the determination information of an external light quantity can be obtained. Also, the relative motion quantity between the imaging apparatus 1 and the subject can be determined according to motion detection of frame comparison, analysis of a blurring quantity for each pixel, or the like.

Further, as the image recognition process in the case that a face image has been detected, the size of a face (the percentage of a facial portion occupied within the image of one frame), facial orientation, the direction in which the eyes of the subject are directed, or the like within the screen can also be obtained as analysis results.

Thus, a greater variety of image analysis results may be used for condition determination.

In the case that an external light quantity is determined for image analysis, in the case the external light quantity is low, or excessively high such as when shooting into bright light or the like, the display on the front display panel 6F can be assumed not to be recognized suitably, as described above with the camera detection information.

Therefore, in the case that an external light quantity is lower than a predetermined level or determined to be shooting into bright light, the CPU 31 determines that the conditions as the visual recognition possibility of the front display panel 6F are not satisfied.

Also, the relative motion quantity between the imaging apparatus 1 and the subject can be determined to be the image analysis result. That is to say, a case where the imaging apparatus 1 itself is blurred or moving (the user is moving the imaging apparatus 1), or a case where the subject is moving, or a case where both are moving can be determined.

When the motion quantity in these cases is great, it can be conceived that even if there is a person serving as a subject, the subject person thereof will have difficulty in recognizing the front display panel 6F suitably.

Therefore, in the case that determination is made that the relative motion between the imaging apparatus 1 and the subject is great, the CPU 31 determines that the conditions as the visual recognition possibility of the front display panel 6F are not satisfied.

Not only simple face detection but also face size (percentage of a facial portion within the screen) can be determined for image analysis. Though depending on the zoom position state, if a certain fixed zoom state is considered, the size of a face can serve as an index to determine the distance from the imaging apparatus 1 to the person serving as a subject. For example, in the case that the zoom state is a wide state, but a face is shot small, the person thereof can be assumed to be in the distance.

Therefore, the CPU 31 determines the distance of a subject person based on the size of a face of the person thereof while taking the zoom position into consideration. Subsequently, in the case that the person thereof is in the distance, and has difficulty in viewing the display content of the front display panel 6F, the CPU 31 determines that the conditions as the visual recognition possibility of the front display panel 6F are not satisfied.

Also, facial orientation or the direction in which the eyes of the subject are directed can also be recognized for image analysis. In the case that a face is not in the front direction on a captured image, or in the case that the subject is not looking at the imaging apparatus 1, the subject person thereof can be determined not to be viewing the imaging apparatus 1, i.e., the front display panel 6F.

Therefore, the CPU 31 confirms the facial orientation or the direction in which the eyes of the subject are directed. Subsequently, in the case that determination is made that the person thereof is not viewing the display content of the front display panel 6F, the CPU 31 determines that the conditions as the visual recognition possibility of the front display panel 6F are not satisfied.

Examples have been given so far regarding condition determination, but with an actual visual recognition possibility condition determination process, at least one of these may be employed, or a combination of two or more may be employed.

It goes without saying that a condition determination process example other than the above examples may be conceived, as long as this condition determination process can assume a visual recognition possibility regarding the display of the front display panel 6F.

With the process in FIG. 7A, the display of the front display panel 6F is suitably executed according to such a condition determination.

Figure 7B:
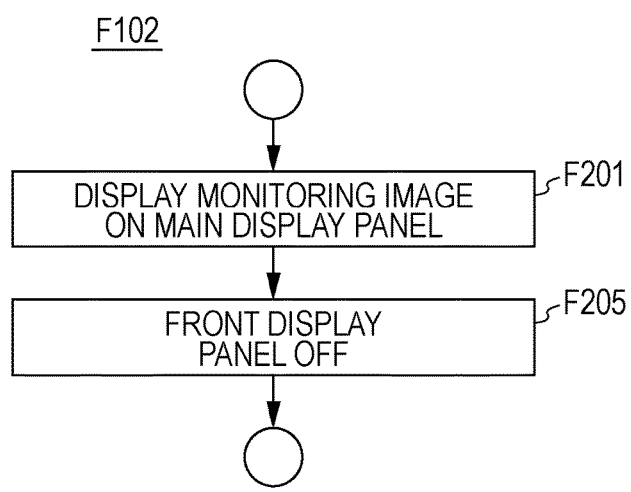

FIG. 7B illustrates another example serving as the process in step F102 in FIG. 6. In this case, in step F201 the CPU 31 controls the main display panel 6M to display a monitoring image during the monitoring period. Also, in step F205 the CPU 31 turns off the display of the front display panel 6F. That is to say, with this example, the display of the front display panel 6F is disabled during the monitoring period.

Process Examples during Recording Period

Next, process examples during the recording period will be described with reference to FIGS. 8A through 9. That is to say, examples of the process of the CPU 31 serving as step F105 in FIG. 6 will be described.

Figure 8A:
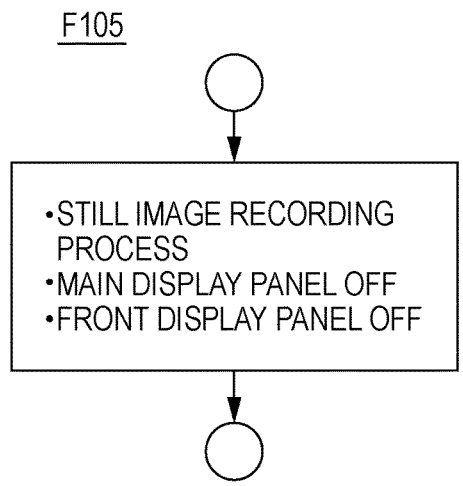
FIGS. 8A through 8D are flowcharts of a process example of a recording period according to the embodiment.

The example in FIG. 8A is an example wherein an image serving as a recording process target is not displayed. That is to say, as a process based on the user's release operation or the like, the CPU 31 transfers captured image data imaged and captured at release timing to the medium interface 10 to record this in the recording medium 90 or flash ROM 33.

Also, during this recording period, the CPU 31 executes control so as to turn off the display of each of the main display panel 6M and front display panel 6F.

Figure 8B:
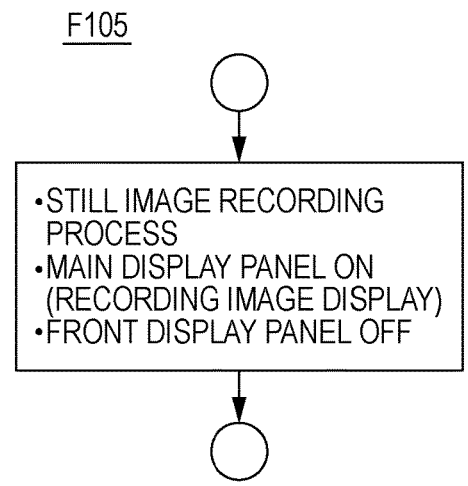

The example in FIG. 8B is an example wherein an image serving as a recording process target is displayed on the main display panel 6M alone during the recording period. That is to say, as a process based on the user's release operation or the like, the CPU 31 records captured image data imaged and captured at release timing in the recording medium 90 or flash ROM 33. Subsequently, during this recording period, the CPU 31 controls the main display panel 6M to display image data according to this recording period, and controls the front display panel 6F to turn off the display. Thus, the user of the imaging apparatus 1 can view a captured image at the shutter timing.

Figure 8C:
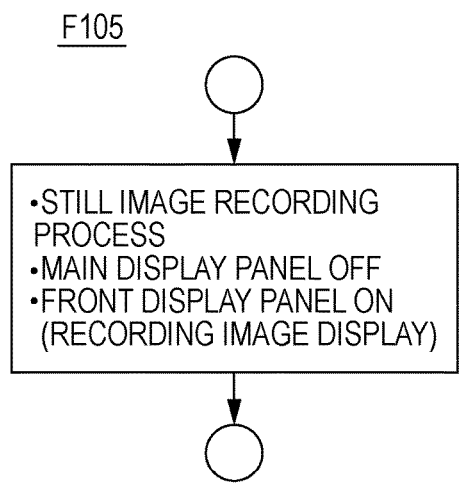

The example in FIG. 8C is an example wherein an image serving as a recording process target is displayed on the front display panel 6F alone. That is to say, as a process based on the user's release operation or the like, the CPU 31 records captured image data imaged and captured at release timing in the recording medium 90 or flash ROM 33. Subsequently, during this recording period, the CPU 31 controls the front display panel 6F to display image data according to this recording period, and controls the main display panel 6M to turn off the display. Thus, a person serving as a subject can view the captured image at the shutter timing.

Figure 8D:
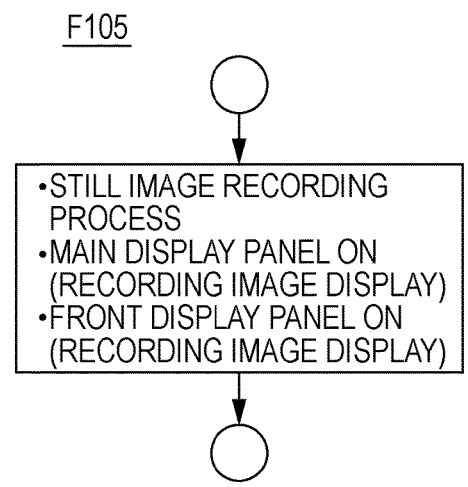

The example in FIG. 8D is an example wherein an image serving as a recording process target is displayed on both of the main display panel 6M and the front display panel 6F. That is to say, as a process based on the user's release operation or the like, the CPU 31 records captured image data imaged and captured at release timing in the recording medium 90 or flash ROM 33. Subsequently, during this recording period, the CPU 31 controls the main display panel 6M and the front display panel 6F to display image data according to this recording period. Thus, the user of the imaging apparatus 1, and a person serving as a subject, can view the captured image at the shutter timing.

Figure 9:
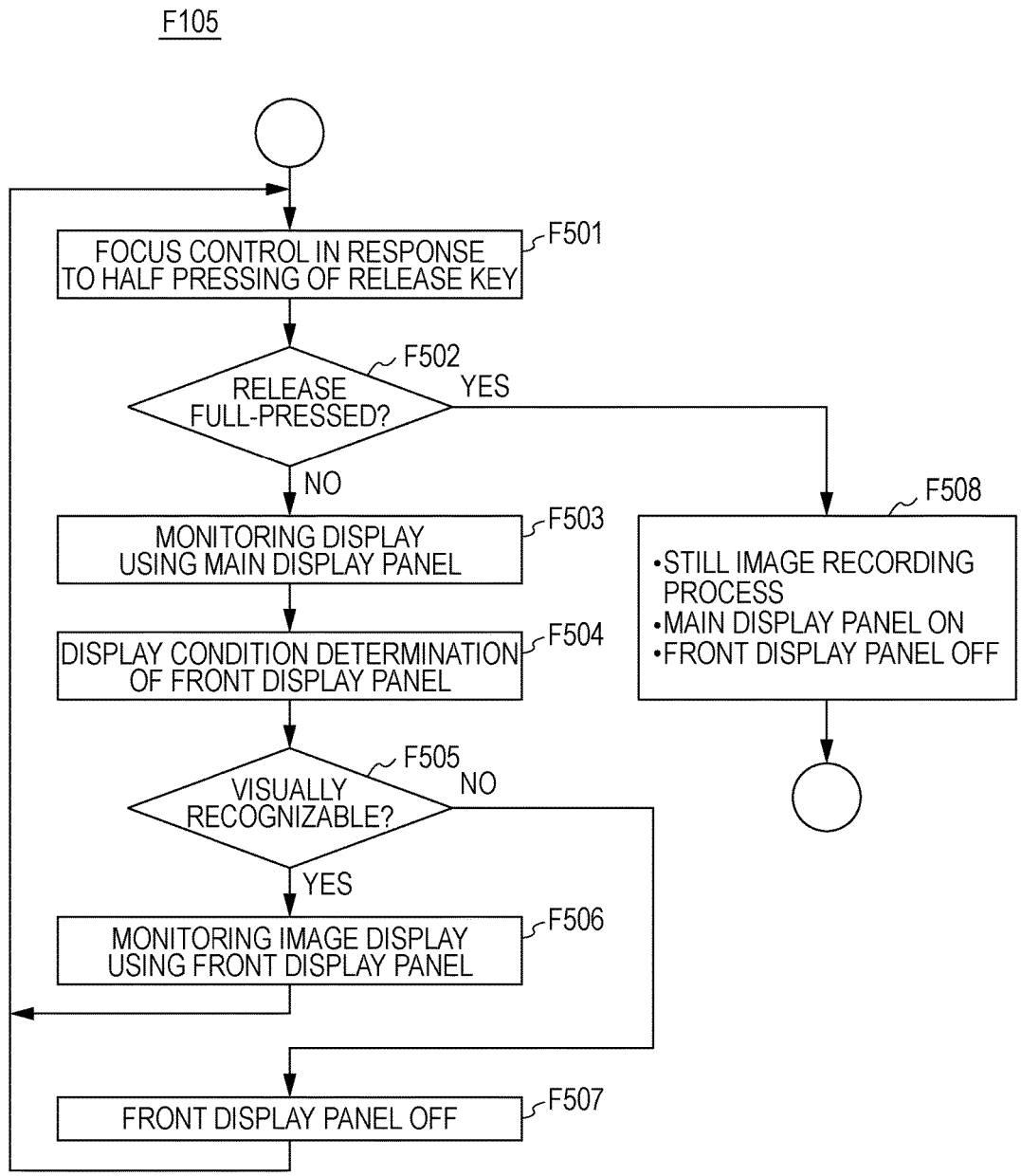
FIG. 9 is a flowchart of a process example of the recording period according to the embodiment.

FIG. 9 is a process example wherein the case of so-called "half-pressing" is taken into consideration as the user's operation relating to the release operation key 5a.

In general, imaging apparatuses such as digital still cameras or the like, wherein focus control to focus the imaging apparatus on a subject in a half-pressing state is executed, are in widespread use. FIG. 9 is an example wherein, in the case that such a function has been applied to the imaging apparatus 1 according to the present example, the half-pressing period thereof is included in the recording period.

FIG. 9 illustrates a process wherein, for example, with the process in FIG. 6, step F104 is half-pressing detection. Upon detecting that the user has half-pressed the release operation key 5a during the monitoring period in FIG. 6, the CPU 31 advances the process from step F104 to step F501 in FIG. 9. Subsequently, the CPU 31 executes focus control with the subject image at that time as a target.

The CPU 31 monitors pressing of the release key 5a in step F502. Specifically, the CPU 31 determines that a release operation has been performed when the user pressed the release operation key 5a from a half-pressed state. Note that, though not shown in FIG. 9, in the case that the user has quit half-pressing without pressing the release operation key 5a, the CPU 31 should return the process to the process during the monitoring period in FIG. 6.

During a period wherein half-pressing continues, the CPU 31 repeats the processes in steps F503 through F507, and step F501.

First, in step F503, the CPU 31 controls the main display panel 6M to display a monitoring image. The current situation is a situation wherein the user is awaiting a suitable timing in a half-pressed state, and accordingly, at this time the user has to view a monitoring image on the main display panel 6M.

On the other hand, with regard to the front display panel 6F, first, in step F504 the CPU 31 executes condition determination regarding a visual recognition possibility relating to the display of the front display panel 6F. Condition determination examples are the same as the examples described above, and the CPU 31 executes, for example, a part or all of a determination process of the presence of a person at the subject side, a determination process of the imaging mode, a determination process regarding internal detection information, a determination process regarding the image analyzing process result of a captured image signal, and so forth. Thus, the CPU 31 determines that there is a person viewing the front display panel 6F, that the person thereof is in a visually recognizable situation all the time in the case that the person thereof attempts to view the front display panel 6F, that the person thereof intends to view the front display panel 6F, or the like.

Subsequently, upon determining that there is a visual recognition possibility, the CPU 31 advances the process from step F505 to step F506 to execute the display control of the monitoring image at the front display panel 6F.

On the other hand, upon determining that there is no visual recognition possibility, the CPU 31 advances the process from step F505 to step F507 to control the front display panel 6F to turn off the display. For example, the CPU 31 changes the front display panel 6F to a non-displaying state, or executes power-off control regarding the front display panel 6F.

That is to say, only in the case that there is a possibility that a subject person views the front display panel 6F, the monitoring image is displayed on the front display panel 6F.

Upon detecting that the user has pressed the release operation key 5a, the CPU 31 proceeds to step F508 to execute the release process.

That is to say, as a process based on the user's release operation or the like, the CPU 31 transfers captured image data imaged and captured at release timing to the medium interface 10 to record this in the recording medium 90 or flash ROM 33.

Also, the CPU 31 executes control so as to turn off the display of each of the main display panel 6M and front display panel 6F.

Note that this step F508 is similar to the above FIG. 8A, but the process of FIG. 8B, 8C, or 8D may be executed. As control processes during the recording period, various examples can be conceived, such as shown in FIG. 8A through FIG. 9.

Process Examples During Preview Period

Next, process examples during the preview period will be described with reference to FIGS. 10 through 13, i.e., examples of the process of the CPU 31 serving as step F106 in FIG. 6 described above will be described.

Figure 10:
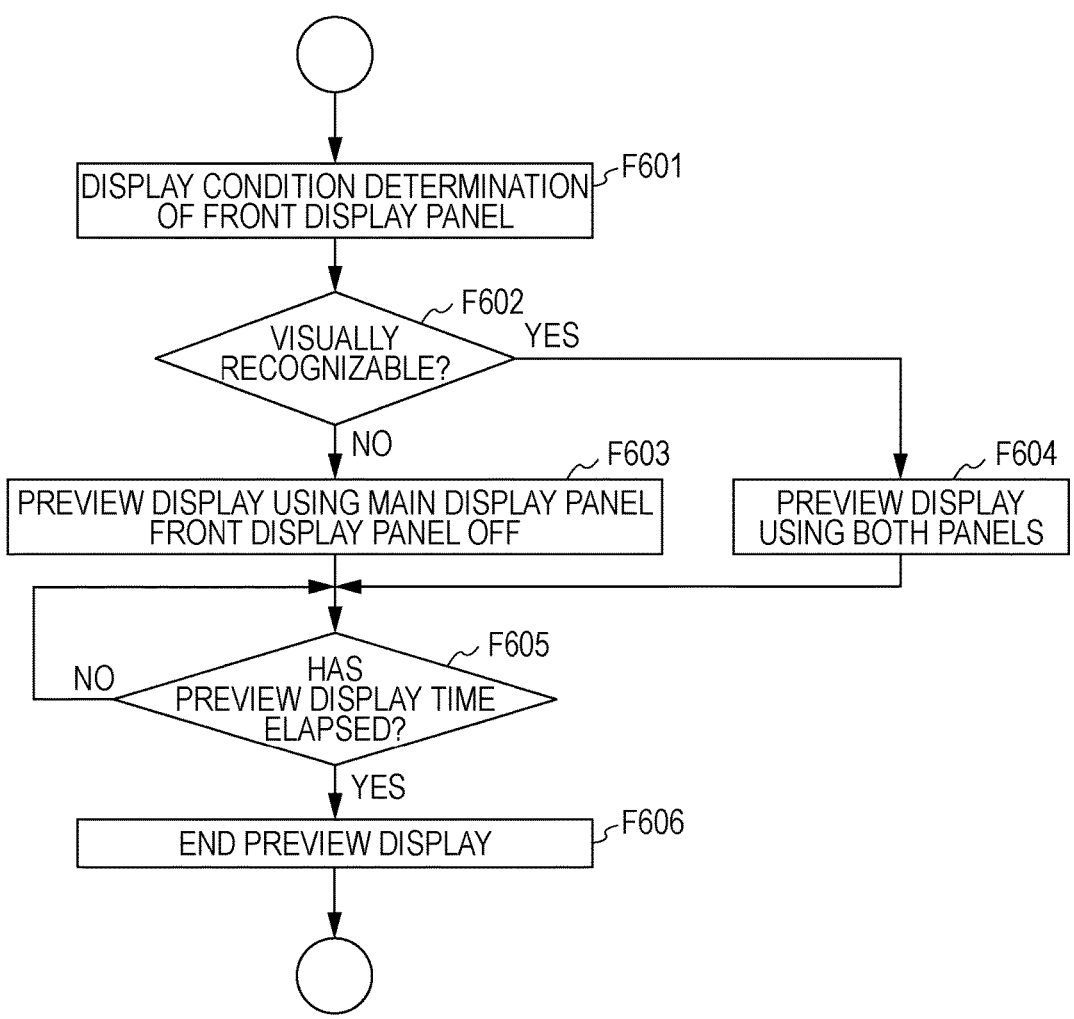
FIG. 10 is a flowchart of a process example of a preview period according to the embodiment.

FIG. 10 is an example wherein preview display is executed on the main display panel 6M for a given length of time during the preview period, and with regard to the front display panel 6F, preview display is executed according to the conditions.

Upon the above process during the recording period being completed, subsequently the CPU 31 executes the process in FIG. 10 as step F106 in FIG. 6. First, in step F601 the CPU 31 executes condition determination regarding a visual recognition possibility relating to the display of the front display panel 6F. In the same way as described above, the CPU 31 executes a part or all of a determination process of the presence of a person at the subject side, a determination process of the imaging mode, a determination process regarding internal detection information, a determination process regarding the image analyzing process result of a captured image signal, and so forth.

Thus, the CPU 31 determines that there is a person who viewing the front display panel 6F, that the person thereof is in a visually recognizable situation all the time in the case that the person thereof attempts to view the front display panel 6F, that the person thereof intends to view the front display panel 6F, or the like.

Subsequently, upon determining that there is a visual recognition possibility regarding the front display panel 6F, the CPU 31 advances the process from step F602 to step F604 to execute preview display control regarding both of the main display panel 6M and the front display panel 6F. That is to say, the CPU 31 controls both of the main display panel 6M and the front display panel 6F to display the image data recorded in the immediately previous process during the recording period.

On the other hand, upon determining that there is no visual recognition possibility regarding the front display panel 6F, the CPU 31 advances the process from step F602 to step F603 to execute preview display control on the main display panel 6M, and control the front display panel 6F to turn off the display. Thus, the image data recorded in the immediately previous process during the recording period is displayed on the main display panel 6M alone.

The preview display started in step F604 or F603 is continued until certain display time has elapsed in step F605. For example, let us say that the certain display time is several seconds or so. The CPU 31 has executed counting of time since the point in time when preview display was started in step F604 or F603, and monitors the elapse of the certain period of time in step F605.

Subsequently, upon the certain period of time having elapsed, the CPU 31 ends the preview display in step F606.

Now, the process in step F106 in FIG. 6 is ended, and the CPU 31 returns to step F101 in FIG. 6 to resume the process during the monitoring period.

According to the process in FIG. 10, preview display is constantly executed on the main display panel 6M for a certain period of time, and preview display is executed on the front display panel 6F for a certain period of time in a situation assumed that there is a viewer.

Figure 11:
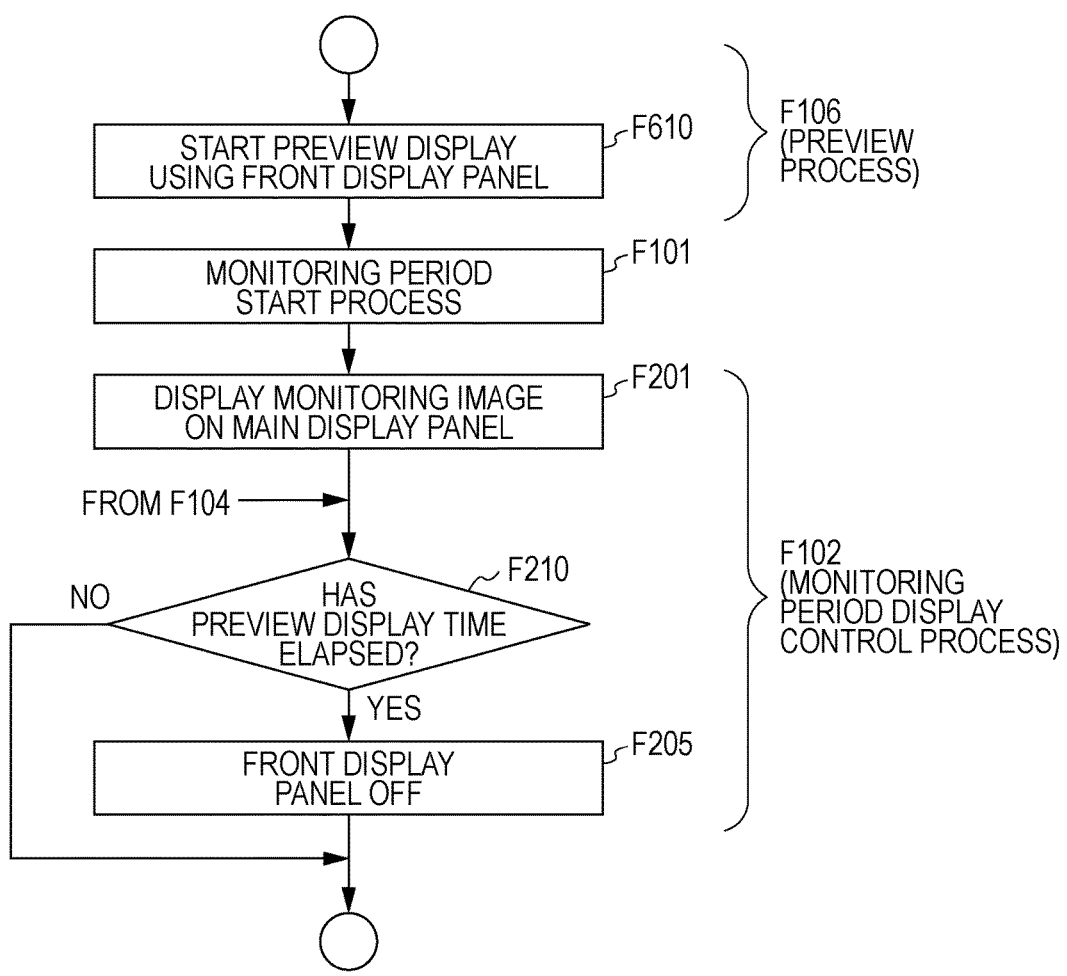
FIG. 11 is a flowchart of a process example of the preview period according to the embodiment.

Next, the process example in FIG. 11 will be described. This FIG. 11 is a process example wherein preview display is executed on the front display panel 6F alone for a certain period of time. Note that, in FIG. 11, a process equivalent to the preview process in step F106 in FIG. 6 is step F610 alone, step F101 is described as step F101 in FIG. 6, and steps F201, F210, F205 are described as the process in step F102 in FIG. 6.

Upon the above process during the recording period being ended, the CPU 31 executes the process in step F610 in FIG. 11 as step F106 in FIG. 6. That is to say, the CPU 31 controls the front display panel 6F to execute preview display regarding the image data recorded in the immediately previous process during the recording period.

Subsequently, the CPU 31 proceeds to step F101 to resume the process during the monitoring period. Subsequently, in step F201 the CPU 31 controls the main display panel 6M to display the monitoring image. Consequently, the monitoring image is displayed on the main display panel 6M, and preview display is executed on the front display panel 6F.

Also, the CPU 31 has executed counting of time since the point in time when preview display was started in step F610, and monitors the elapse of the certain period of time in step F210. Subsequently, upon the certain period of time having elapsed, the CPU 31 ends the preview display of the front display panel 6F in step F205.

As described in FIG. 6, the CPU 31 repeats the process in step F102 while executing the monitoring process in steps F103 and F104. Accordingly, in the case of FIG. 11 as well, in the event that neither a playback instruction (F103) nor a release operation (F104) have been detected, the CPU 31 repeats the process in steps F201, F210, and F205 while returning fro step F104 to step F201.

Consequently, according to the process in FIG. 11, immediately after preview display is started on the front display panel 6F during the preview period, the process during the monitoring period is executed, and the display of the monitoring image is started on the main display panel 6M. Subsequently, upon the preview display on the front display panel 6F being executed for a certain period of time, the preview display on the front display panel 6F is ended, and the display of the front display panel 6F is turned off.

Accordingly, the user of the imaging apparatus 1 can immediately view the monitoring image without viewing the preview display, and can proceed to preparation for the next still image recording, and also a subject person can confirm a still image where the subject person thereof is shot for a certain period of time.

Note that, as a modification of this process, an arrangement may be made wherein after the preview display on the front display panel 6F is ended, the process in steps F202 through F205 in FIG. 7A is executed, and the monitoring image is displayed on the front display panel 6F according to conditions.

Figure 12:
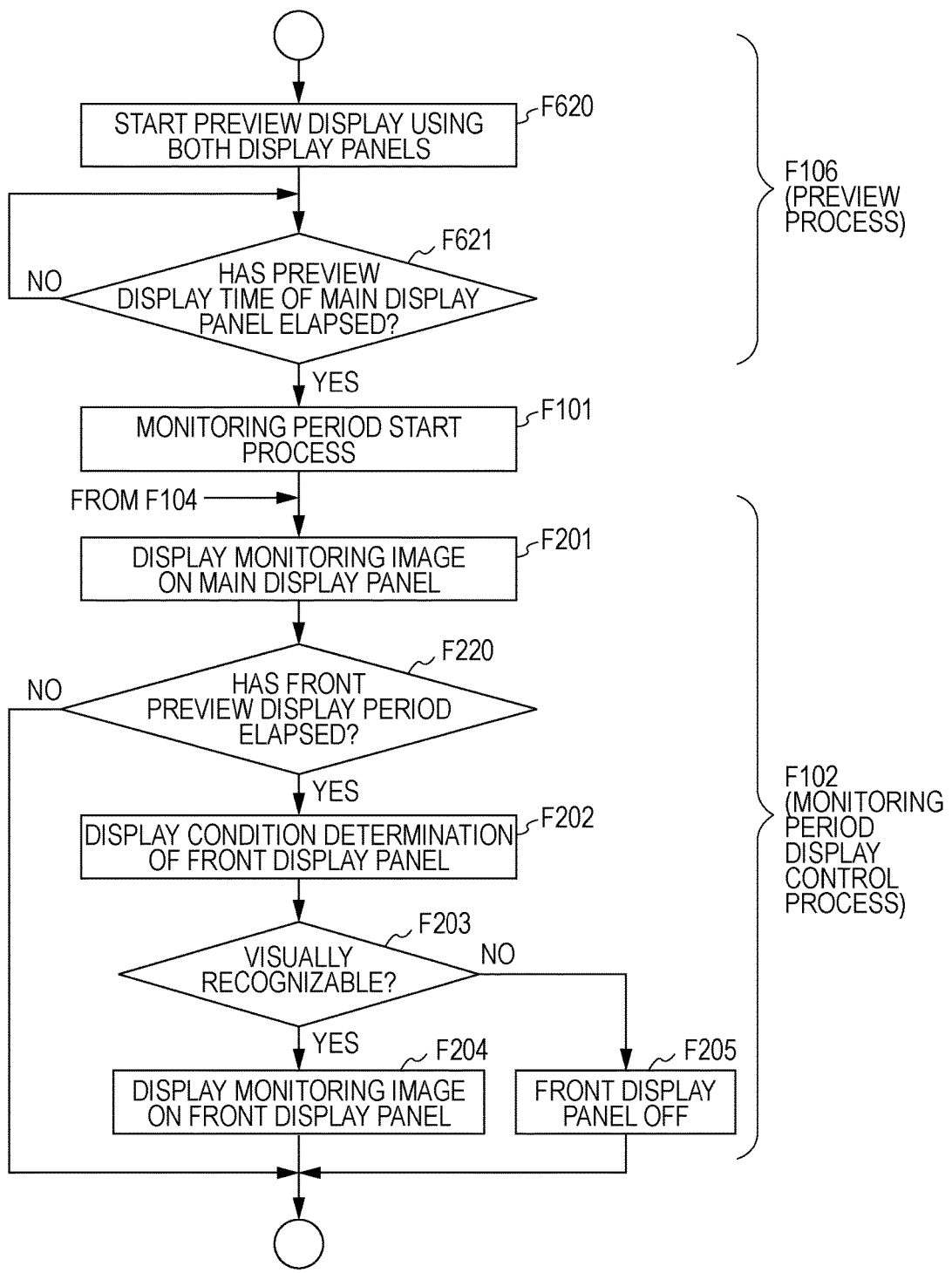
FIG. 12 is a flowchart of a process example of the preview period according to the embodiment.

Next, the process example in FIG. 12 will be described. FIG. 12 is an example wherein preview display is executed on both display panels 6M and 6F, but the preview display on the front display panel 6F is executed longer.

Note that, in FIG. 12, a process equivalent to the preview process in step F106 in FIG. 6 is steps F620 and F621, step F101 is described as step F101 in FIG. 6, and steps F201 through F205 and F220 are described as the process in step F102 in FIG. 6.

Upon the above process during the recording period being ended, the CPU 31 executes the process in step F620 in FIG. 12 as step F106 in FIG. 6. That is to say, the CPU 31 controls both of the main display panel 6M and the front display panel 6F to execute preview display regarding the image data recorded in the immediately previous process during the recording period.

The CPU 31 has executed counting of time since the point in time when preview display was started in step F620. Subsequently, the CPU 31 monitors the elapse of a certain period of time in step F621. However, in this case, the CPU 31 monitors the elapse of a predetermined period of time T1 serving as the preview display on the main display panel 6M.

The preview display on both display panels 6M and 6F is continued as the preview period until the predetermined period of time T1 elapses.

Upon the predetermined period of time T1 having elapsed, the CPU 31 proceeds from step F621 to step F101 to resume the process during the monitoring period. Note that the CPU 31 continues counting of time without interruption.

Subsequently, in step F201 the CPU 31 controls the main display panel 6M to display the monitoring image. Accordingly, the main display panel 6M is switched from the preview display to the monitoring image display, and on the other hand, the front display panel 6F continues the preview display.

After proceeding to the monitoring period, in step F220 the CPU 31 monitors the elapse of a certain period of time regarding counting of time since the preview display was started in step F620 described above. In this case, the CPU 31 monitors the elapse of a predetermined period of time T2 (T1<T2) serving as the preview display on the front display panel 6F.

As described in FIG. 6, the CPU 31 repeats the process in step F102 while executing the monitoring process in steps F103 and F104. Accordingly, in the case of FIG. 12 as well, if neither a playback instruction (F103) nor a release operation (F104) have been detected, the CPU 31 returns from step F104 to step F201, and repeats steps F220, and F202 through F205. Therefore, even after entering the monitoring period, the preview on the front display panel 6F is continued until the elapse of the predetermined period of time T2 is determined in step F220.

Subsequently, after the elapse of the predetermined period of time T2, the CPU 31 executes the process in steps F202 through F205 in FIG. 12 as the process in step F102.

That is to say, in step F202 the CPU 31 executes condition determination regarding a visual recognition possibility relating to the display on the front display panel 6F. The CPU 31 executes, for example, a part or all of a determination process of the presence of a person at the subject side, a determination process of the imaging mode, a determination process regarding internal detection information, a determination process regarding the image analyzing process result of a captured image signal, and so forth.

Subsequently, upon determining that there is a visual recognition possibility regarding the front display panel 6F, the CPU 31 advances the process to step F204 from step F203 to execute monitoring image display control on the front display panel 6F.

On the other hand, upon determining that there is no visual recognition possibility regarding the front display panel 6F, the CPU 31 advances the process to step F205 from step F203 to control the front display panel 6F to turn off the display.

Consequently, according to the process in FIG. 12, the preview display is executed on both display panels 6M and 6F as the preview period. Subsequently, the preview display on the main display panel 6M is ended first, the CPU 31 proceeds to the process during the monitoring period, and the display of the main display panel 6M is changed to the monitoring image.

With the front display panel 6F, even after entering the monitoring period, the preview display is continued until the elapse of a certain amount of time T2. Subsequently, after the preview display is ended, the monitoring image is displayed on the front display panel 6F, or the display thereof is turned off, depending on the visual recognition possibility.

Accordingly, immediately after the user of the imaging apparatus 1 confirms the preview display for a short of period, the user can view the monitoring image, and can proceed to preparation for the next still image recording. Consequently, a subject person can view a still image where the person thereof is shot for a relatively long period of time.

Note that, as a modification of this process, an arrangement may be made wherein, after the preview display on the front display panel 6F is ended, the display of the front display panel 6F is turned off forcibly during the monitoring period.

Figure 13:
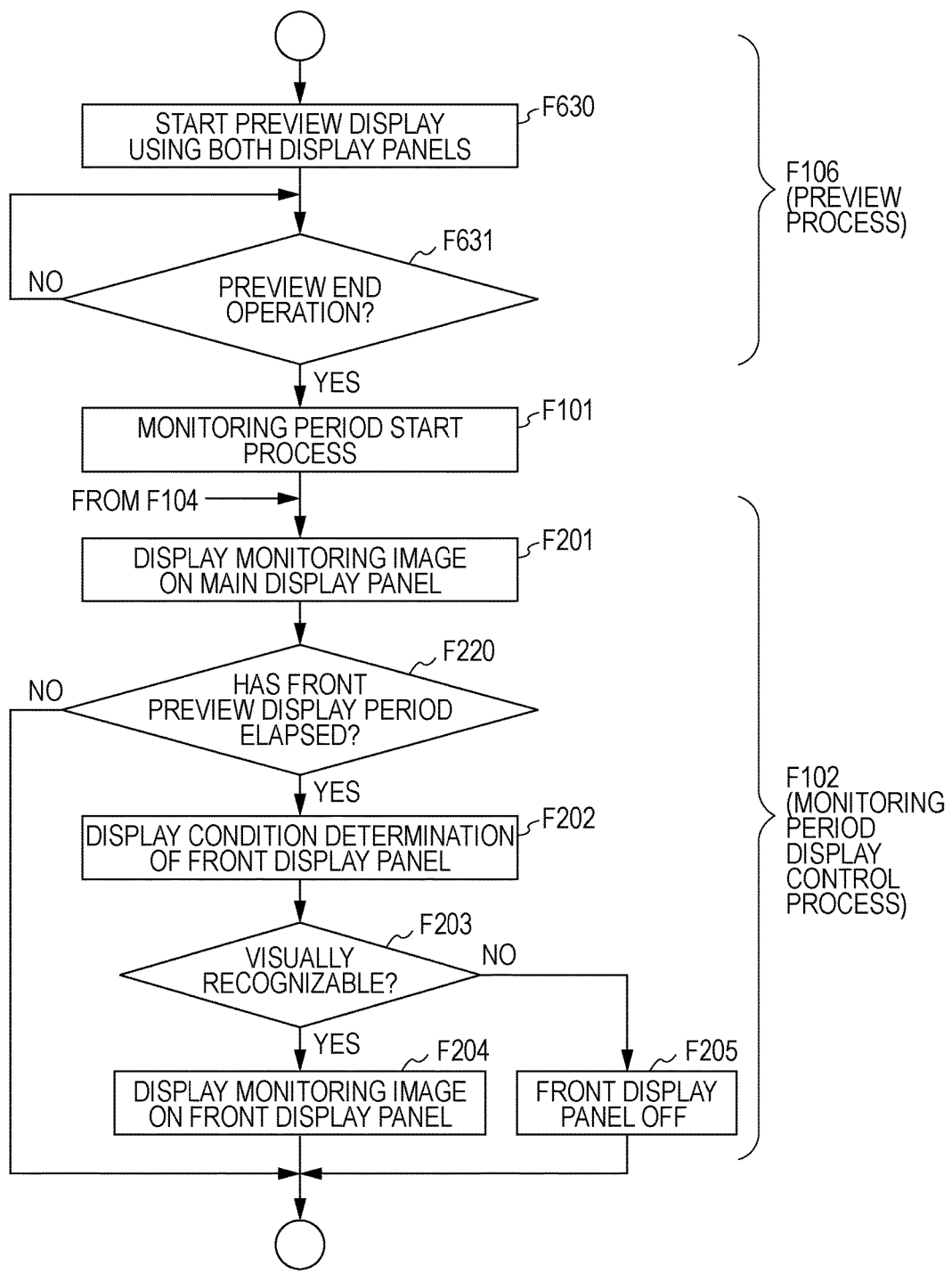
FIG. 13 is a flowchart of a process example of the preview period according to the embodiment.

Next, the process example in FIG. 13 will be described. FIG. 13 is an example wherein the preview display is executed on both display panels 6M and 6F, but the preview display is ended by the user's operation during the preview period, and also the preview display on the front display panel 6F is executed for a longer period of time.

Note that, in FIG. 13, a process equivalent to the preview process in step F106 in FIG. 6 is steps F630 and F631, step F101 is described as step F101 in FIG. 6, and steps F201 through F205 and F220 are described as the process in step F102 in FIG. 6.

Upon ending the above process during the recording period, the CPU 31 executes the process in step F630 in FIG. 13 as step F106 in FIG. 6. That is to say, the CPU 31 controls both of the main display panel 6M and the front display panel 6F to execute the preview display regarding the image data recorded in the immediately previous process during the recording period.

In step F631, the CPU 31 monitors whether or not an instructing operation used for ending the preview display has been performed as the user's operation.

The preview display on both display panels 6M and 6F is continued as the preview period until an operation used for ending the preview display is performed.

Upon detecting a preview display ending operation, the CPU 31 proceeds to step F101 from step F631 to resume the process during the monitoring period. Subsequently, in step F201 the CPU 31 controls the main display panel 6M to display the monitoring image.

Accordingly, the main display panel 6M is changed from the preview display to the monitoring image display, and on the other hand, the preview display is continued on the front display panel 6F.

After proceeding to the monitoring period, in step F220 the CPU 31 monitors the elapse of a certain period of time regarding counting of time since the preview display was started in step F630 described above. Alternatively, the CPU 31 may start counting of time at the time of proceeding to the monitoring period.

As described in FIG. 6, the CPU 31 repeats the process in step F102 while executing the monitoring process in steps F103 and F104. Accordingly, in the case of FIG. 13 as well, if neither a playback instruction (F103) nor a release operation (F104) have been detected, the CPU 31 returns from step F104 to step F201, and repeats steps F220, and F202 through F205. Therefore, even after entering the monitoring period, the preview on the front display panel 6F is continued until the elapse of a certain period of time is determined in step F220.

Subsequently, after the elapse of the certain period of time, the CPU 31 executes the process in steps F202 through F205 in FIG. 13 as the process in step F102.

That is to say, in step F202 the CPU 31 executes condition determination regarding a visual recognition possibility relating to the display on the front display panel 6F. The CPU 31 executes, for example, a part or all of a determination process of the presence of a person at the subject side, a determination process of the imaging mode, a determination process regarding internal detection information, a determination process regarding the image analyzing process result of a captured image signal, and so forth.

Subsequently, upon determining that there is a visual recognition possibility regarding the front display panel 6F, the CPU 31 advances the process to step F204 from step F203 to execute monitoring image display control on the front display panel 6F.

On the other hand, upon determining that there is no visual recognition possibility regarding the front display panel 6F, the CPU 31 advances the process to step F205 from step F203 to control the front display panel 6F to turn off the display.

Consequently, according to the process in FIG. 13, the preview display is executed on both display panels 6M and 6F as the preview period until the user's operation to end the preview display is performed.

Subsequently, upon the user's operation to end the preview display being performed, the preview display on the main display panel 6M is ended, the CPU 31 proceeds to the process during the monitoring period, and the display of the main display panel 6M is changed to the monitoring image.

With the front display panel 6F, even after entering the monitoring period, the preview display is continued until the elapse of a certain period of time. Subsequently, after the preview display is ended, the monitoring image is displayed on the front display panel 6F, or the display thereof is turned off, depending on the visual recognition possibility.

Accordingly, the user of the imaging apparatus 1 can confirm the preview display for an arbitrary period of time. Subsequently, the user ends the preview display depending on his own will, whereby the user can view the monitoring image at this time, and can proceed to preparation for the next still image recording. Even after proceeding to the monitoring period, a subject person can confirm a still image where the person thereof is shot for a certain period of time.

Note that, as a modification of this process, an arrangement may be made wherein, after the preview display on the front display panel 6F is ended, the display of the front display panel 6F is turned off forcibly during the monitoring period.

Also, there is a possibility that the user has not performed a preview display ending operation everlastingly, and accordingly, a process example may also be conceived wherein, upon detecting no operation for a certain long period of time in step F631, the CPU 31 proceeds to the monitoring period automatically.

Process Examples during Playback Period

Next, process examples during the playback period will be described with reference to FIGS. 14A through 15. That is to say, examples of the process of the CPU 31 serving as step F107 in FIG. 6 described above will be described.

FIG. 14A is an example wherein playback display is executed on the main display panel 6M alone during the playback period. In the case of proceeding to step F107 in FIG. 6, in step F701 in FIG. 14A the CPU 31 controls the front display panel 6F to turn off the display.

Subsequently, in step F702 the CPU 31 executes data readout control from the recording medium 90 or flash ROM 33 in response to the user's operation to controls the main display panel 6M to play and display the read image data. That is to say, this example is an example wherein the front display panel 6F is not used regarding playback display.

FIG. 14B is an example wherein playback display is also executed on the front display panel 6F in some cases. In the case of proceeding to step F107 in FIG. 6, in step F710 in FIG. 14B the CPU 31 executes condition determination regarding a visual recognition possibility relating to the display of the front display panel 6F. The CPU 31 executes, for example, a part or all of a determination process of the presence of a person at the subject side, a determination process of the imaging mode, a determination process regarding internal detection information, a determination process regarding the image analyzing process result of a captured image signal, and so forth.

Subsequently, upon determining that there is a visual recognition possibility regarding the front display panel 6F, the CPU 31 advances the process to step F713 from step F711 to execute data readout control from the recording medium 90 or flash ROM 33 in response to the user's operation. Subsequently, the CPU 31 controls both of the main display panel 6M and the front display panel 6F to execute playback display.

On the other hand, upon determining that there is no visual recognition possibility regarding the front display panel 6F, the CPU 31 advances the process to step F712 from step F711 to execute data readout control from the recording medium 90 or flash ROM 33 in response to the user's operation. Subsequently, the CPU 31 controls the main display panel 6M to execute playback display, and controls the front display panel 6F to turn off the display. Thus, a playback image is displayed on the main display panel 6M alone.

Thus, in the case of assuming that the display of the front display panel 6F is effective, the CPU 31 also controls the front display panel 6F to display the playback image. Thus, a person in the front side can also enjoy the playback image.

Figure 15:
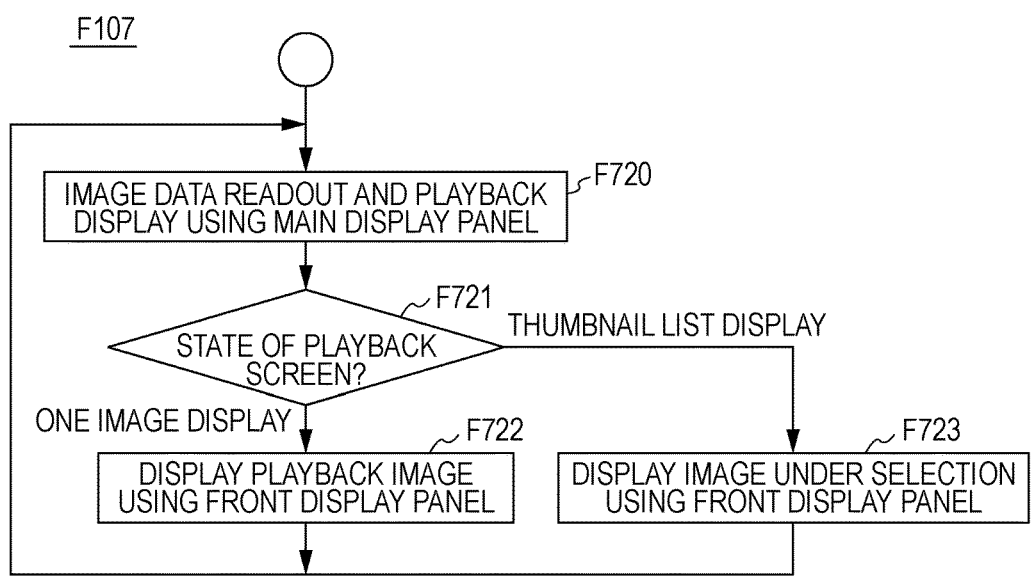
FIG. 15 is a flowchart of a process example of the playback period according to the embodiment.

The process in FIG. 15 is an example wherein a playback image is displayed on both display panels 6M and 6F during the playback period, but the display of the main display panel 6M and the display of the front display panel 6F differs.

In the case of proceeding to step F107 in FIG. 6, in step F720 in FIG. 15 the CPU 31 executes playback display control on the main display panel 6M. That is to say, the CPU 31 executes data readout control from the recording medium 90 or flash ROM 33 in response to the user's operation to play and display the read image data on the main display panel 6M.

Subsequently, with regard to the front display panel 6F, the CPU 31 branches the process depending on the playback display state on the main display panel 6M.

As playback image display on the main display panel 6M, the display mode is changed in response to the user's operation. For example, one image is changed at a time in response to the user's operation, or a list serving as thumbnail images is displayed in some cases.

In step F721, the CPU 31 branches the process depending on whether a thumbnail list of playback images or a single image is displayed on the main display panel 6M.

In the case that a single playback image is now displayed on the main display panel 6M, the CPU 31 advances the process to step F722 to instruct the display controller 7 to display the same playback image data on the front display panel 6F as well. In this case, the display states of the main display panel 6M and the front display panel 6F are states such as shown in FIG. 5C.

On the other hand, in the case that a thumbnail list is now displayed on the main display panel 6M, the CPU 31 advances the process to step F723. In this case, the CPU 31 instructs the display controller 7 to display on the front display panel 6F playback image data selected by the cursor K on the thumbnail list display. In this case, the display states of the main display panel 6M and the front display panel 6F are states such as shown in FIG. 5B.

By the CPU 31 executing such a process, a person in the front side can also view on the front display panel 6F side simultaneously. Accordingly, the user of the imaging apparatus 1, and the person in the front side can enjoy a playback image.

Also, as shown in FIG. 5B, in the case that a thumbnail list is displayed on the main display panel 6M, the user of the imaging apparatus 1 moves the cursor K, whereby a person in the front side can view the selected playback image on the front display panel 6F side.

Note that, as a modification of the process in FIG. 15, for example, an arrangement may be made wherein the same process as steps F202 through F205 in FIG. 7A is executed before step F721 in FIG. 15, and playback display in step F722 or F723 is executed on the front display panel 6F according to conditions.

Process Examples during Moving Image Recording Period

The process during each operation period in the case of executing imaging of a still image at the imaging apparatus 1 has been described so far. A case can be assumed wherein recording of a moving image is executed at the imaging apparatus 1, and accordingly, process examples in the case of moving image recording will be described here.

Figure 16:
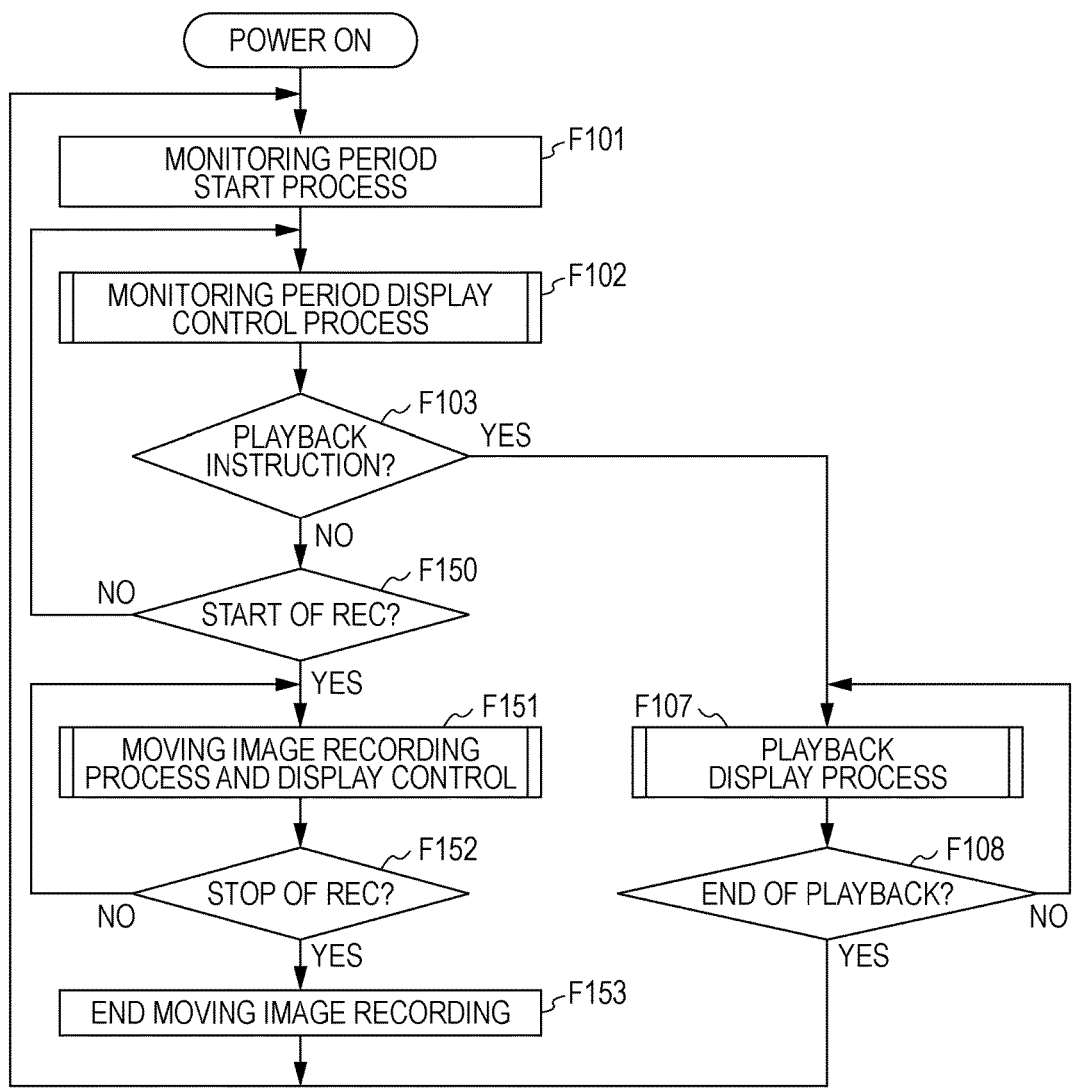
FIG. 16 is a flowchart of a control process example including a moving image recording period according to the embodiment.

FIG. 16 is a process example according to the transition of each operation period in the case of executing recording of a moving image. Steps F101 through F103, F107, and F108 are the same as those in FIG. 6. The process (F104 through F106) as the operation process relating to recording of a still image in FIG. 6 is shown in steps F150 through F153 in FIG. 16 serving as the process relating to recording of a moving image.

The monitoring period is a period in a standby state until recording of a moving image is started, but a monitoring image is displayed as step F102. In this case, for example, a process such as shown in FIG. 7A or 7B is executed.

During the monitoring period, in response to the user's recording start operation, the CPU 31 proceeds to step F151 from step F150 to execute a moving image recording process and display control under recording. The process in step F151 is continued until the user performs a recording stop operation, or until recording is determined to be stopped due to recording no longer being capable owing to a capacity-full state of the recording medium 90 or the like.

Upon recording being stopped by the user's operation or the like, the CPU 31 proceeds to step F153 from step F152 to execute a moving image ending process, and returns to step F101 to resume the operation of the monitoring period.

Figure 17A:
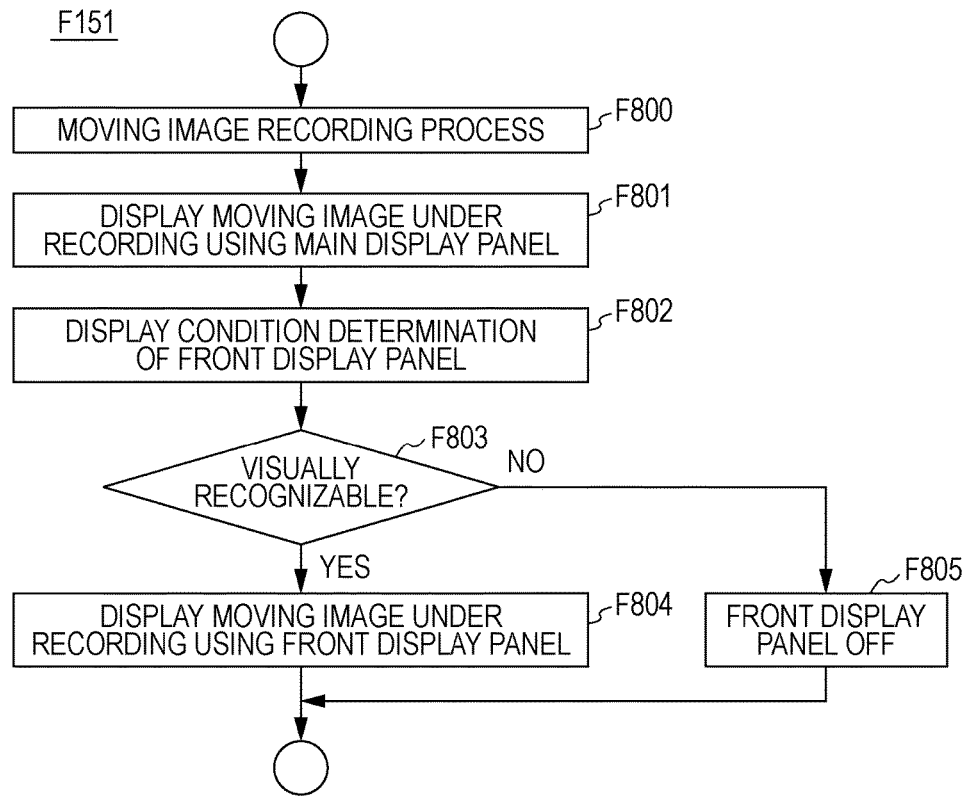
FIGS. 17A through 17C are flowcharts of a process example of the moving image recording period according to the embodiment.
Figure 17B:
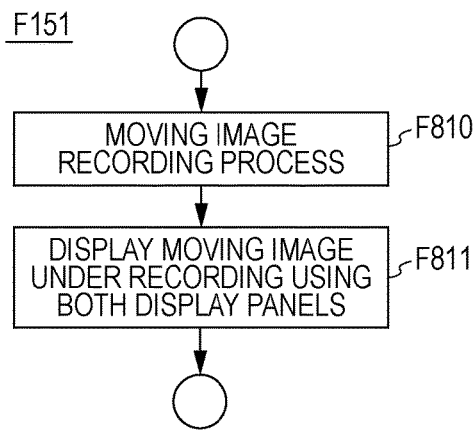
Figure 17C:
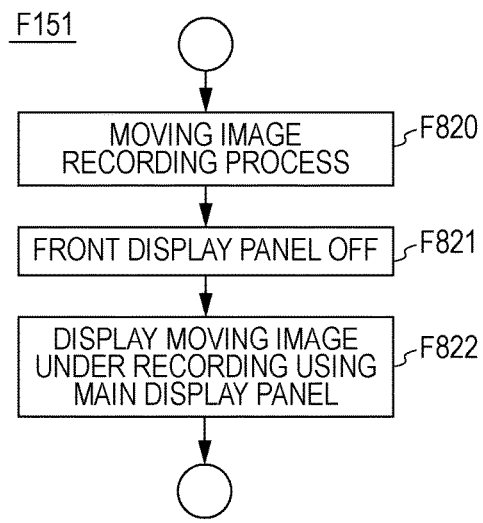

Now, the process examples in step F151 will be shown in FIGS. 17A, 17B, and 17C.

FIG. 17A is an example wherein image display during recording of a moving image is also executed on the front display panel 6F depending on the situation. In the case of proceeding to step F151 in FIG. 16, the CPU 31 executes a moving image recording process in step F800 in FIG. 17A. That is to say, the CPU 31 executes a process wherein the captured image data of each frame obtained at the imaging system 2 and camera DSP 4 is subjected to a predetermined compression encoding process or the like, and this is recorded in the recording medium 90 or flash ROM 33 as a moving image.

At the time of this moving image recording process, in step F801 the CPU 31 executes moving image display control on the main display panel 6M. That is to say, the CPU 31 controls the main display panel 6M to execute moving image display serving as a monitor image under recording.

The CPU 31 executes steps F802 through F805 with regard to the front display panel 6F.

In step F802, the CPU 31 executes condition determination regarding a visual recognition possibility relating to the display of the front display panel 6F. The CPU 31 executes, for example, a part or all of a determination process of the presence of a person at the subject side, a determination process of the imaging mode, a determination process regarding internal detection information, a determination process regarding the image analyzing process result of a captured image signal, and so forth.

Upon determining that there is a visual recognition possibility regarding the front display panel 6F, the CPU 31 advances the process from step F803 to step F804 to execute moving image display serving as a monitoring image under recording on the front display panel 6F. That is to say, in this case, moving image monitor display is executed on both of the main display panel 6M and the front display panel 6F.

On the other hand, upon determining that there is no visual recognition possibility regarding the front display panel 6F, the CPU 31 advances the process from step F803 to step F805 so as to control the front display panel 6F to turn off the display. Thus, moving image monitor display is displayed on the main display panel 6M alone.

Thus, in the case that the display on the front display panel 6F is assumed to be effective, moving image display under recording is also executed on the front display panel 6F. Thus, a person in the front side can also view the monitor image of the recorded moving image.

FIG. 17B is an example wherein monitor image display under moving image recording is executed on both display panels 6M and 6F. In the case of proceeding to step F151 in FIG. 16, the CPU 31 executes a moving image recording process in step F810 in FIG. 17B, i.e., executes a process wherein the captured image data of each frame obtained at the imaging system 2 and camera DSP 4 is subjected to a predetermined compression encoding process or the like to record this in the recording medium 90 or flash ROM 33 as a moving image.

Subsequently, at the time of this moving image recording process, in step F811 the CPU 31 executes moving image display control as to the main display panel 6M and the front display panel 6F, i.e., controls both display panels 6M and 6F to display a moving image serving as a monitor image under recording.

FIG. 17C is an example wherein monitor image display under recording of a moving image is executed on the main display panel 6M alone. In the case of proceeding to step F151 in FIG. 16, the CPU 31 executes a moving image recording process in step F820 in FIG. 17C, i.e., executes a process wherein the captured image data of each frame obtained at the imaging system 2 and camera DSP 4 is subjected to a predetermined compression encoding process or the like to record this in the recording medium 90 or flash ROM 33 as a moving image.

Subsequently, in step F821 the CPU 31 controls the front display panel 6F to turn off the display, and in step F822 executes moving image display control at the main display panel 6M, i.e., prevents the front display panel 6F from being used regarding moving image display serving as a monitor image under recording.

For example, in the case of executing recording of a moving image, display control example can be conceived, such as the above FIGS. 17A, 17B, and 17C.

Transition Examples of Display State

The control examples relating to the display on the main display panel 6M and the front display panel 6F have been described regarding the monitoring period, still image recording period, preview period, playback period, and moving image recording period.

With the imaging apparatus 1 according to the present example, a series of still image imaging operation, playback operation, and moving image recording operation are executed while each operation period of those changes. Subsequently, with each operation period, one of the above process examples is employed, whereby display effective for both display panels 6M and 6F is realized.

FIGS. 18 and 19 exemplify the display states on both display panels 6M and 6F accompanying the transition of an operation period as examples #1 through #8.

The examples #1 through #5 illustrate a display state example in the case that the operation period changes, such as monitoring period→still image recording period preview period→monitoring period, i.e., in the case that recording of a still image is executed according to monitoring period→still image recording period→preview period, and then during the monitoring period the monitoring period is proceeded to the playback period by the user's operation or the like.

First, the example #1 shown in FIG. 18 is a case where the process in FIG. 7A serving as the process during the monitoring period, the process in FIG. 8A serving as the process during the still image recording period, the process in FIG. 10 serving as the process during the preview period, and the process in FIG. 14A serving as the process during the playback period are employed.

With regard to the main display panel 6M, monitoring image display is constantly executed during the monitoring period, the display is turned off for just a moment serving as the still image recording period, and preview display is executed for a predetermined period of time during the preview period.

With regard to the front display panel 6F, monitoring image display is executed during the monitoring period in the case that assumption is made that there is a visual recognition possibility, but in the case that assumption is made that there is no visual recognition possibility, the display is turned off, thereby preventing wasteful display from being executed. The display is turned off for just a moment serving as the still image recording period, preview display is executed for a predetermined period of time during the preview period in the case that there is a visual recognition possibility, but in the case that there is no visual recognition possibility, preview display is not executed. Also, playback display is not executed during the playback period.

That is to say, this example #1 is an example wherein, with regard to the front display panel 6F, monitoring image display and preview display are executed according to visual recognition possibility conditions.

The example #2 is a case where the process in FIG. 7B serving as the process during the monitoring period, the process in FIG. 8B serving as the process during the still image recording period, the process in FIG. 10 serving as the process during the preview period, and the process in FIG. 14B serving as the process during the playback period are employed.

With regard to the main display panel 6M, monitoring image display is constantly executed during the monitoring period, the display of a recorded still image is executed from the still image recording period to the preview period, and playback display is executed during the playback period.

With regard to the front display panel 6F, the display is turned off during the monitoring period. The display is still turned off during the still image recording period. Preview display is executed for a predetermined period of time in the case that there is a visual recognition possibility, but in the case that there is no visual recognition possibility, preview display is not executed. Also, during the playback period, playback display is not executed according to regarding whether or not there is a visual recognition possibility, or the display is turned off.

That is to say, this example #2 is an example wherein, with regard to the front display panel 6F, display regarding a recorded still image or playback image is executed according to visual recognition possibility conditions.

The example #3 is a case where the process in F102 in FIG. 11 serving as the process during the monitoring period, the process in FIG. 8C serving as the process during the still image recording period, the process in F106 in FIG. 11 serving as the process during the preview period, and the process in FIG. 15 serving as the process during the playback period are employed.

With regard to the main display panel 6M, monitoring image display is constantly executed during the monitoring period. The display is not executed during the still image recording period and the preview period, but the display is momentarily turned off during the still image recording period and the preview period as viewed from the user, and immediately the operation period proceeds to the monitoring period, where monitoring image display is executed. Also, during the playback period, playback display is executed in a format such as single image display or thumbnail list display or the like.

With regard to the front display panel 6F, the display is turned off during the monitoring period. A still image to be recorded is displayed during the still image recording period, and the image thereof is also continued during the preview period. In this case, preview display is continued even in the case of proceeding to the monitoring period. Upon preview display for a certain period of time being ended, the display is turned off. Also, during the playback period, a single image similar to the main display panel 6M, or a single image under selection in the case that a thumbnail list image is displayed on the main display panel 6M is displayed.

That is to say, this example #3 is an example wherein, with the main display panel 6M, preview of a recorded image is prevented from being executed, and with the front display panel 6F, monitoring image display is not executed, a recorded still image (preview image) or playback image is displayed.

The example #4 is a case where the process in F102 in FIG. 12 serving as the process during the monitoring period, the process in FIG. 8D serving as the process during the still image recording period, the process in F106 in FIG. 12 serving as the process during the preview period, and the process in FIG. 14B serving as the process during the playback period are employed.

With regard to the main display panel 6M, monitoring image display is constantly executed during the monitoring period. The display of a recorded still image is displayed from the still image recording period to the preview period. Upon the preview period being ended, the operation period proceeds to the monitoring period, where monitoring image display is executed. Also, during the playback period playback display is executed.

With regard to the front display panel 6F, during the monitoring period, monitoring image display is executed, or the display is turned off, depending on whether or not there is a visual recognition possibility. A recorded still image is displayed from the still image recording period to the preview period. In this case, preview display is executed for a longer period than the main display panel 6M. That is to say, even in the event of proceeding to the monitoring period, preview display is continued for a certain period of time. After preview display is ended, monitoring image display is executed, or the display is turned off, depending on whether or not there is a visual recognition possibility. Also, during the playback period, playback display is executed, or the display is turned off, depending on whether or not there is a visual recognition possibility.

This example #4 is an example wherein, with the front display panel 6M, preview display is executed as long as possible, and monitoring image display and playback display are executed depending on visual recognition possibility conditions.

The example #5 shown in FIG. 19 is a case where the process in F102 in FIG. 13 serving as the process during the monitoring period, the process in FIG. 9 serving as the process during the still image recording period, the process in F106 in FIG. 13 serving as the process during the preview period, and the process in FIG. 15 serving as the process during the playback period are employed.

With regard to the main display panel 6M, monitoring image display is constantly executed during the monitoring period. Monitoring image display is continued while half-pressing during the still image recording period. The display is turned off at the time of the release process. During the preview period, preview display is continued until the user performs a preview display end operation. Also, during the playback period, playback display is executed in a format such as single image display or thumbnail list display or the like.

With regard to the front display panel 6F, during the monitoring period, monitoring image display is executed, or the display is turned off, depending on whether or not there is a visual recognition possibility. The display operation depending on conditions is also continued during half-pressing during the still image recording period. The display is turned off at the time of the release process. During the preview period, preview display is executed, but even in the event of proceeding to the monitoring period, preview display is continued. Upon preview display for a certain period of time being ended, the front display panel 6F returns to the state of monitoring image display depending on whether or not there is a visual recognition possibility. Also, during the playback period, a single image similar to the main display panel 6M, or a single image selected in the case that the display of the main display panel 6M is a thumbnail list image, is displayed.

That is to say, this example #5 is an example wherein, with the main display panel 6M, preview of a recorded image is ended by the user's operation, but even in the event that the preview period is ended and proceeds to the monitoring period, preview display is continued on the front display panel 6F for a certain period of time.

The examples #6 through #8 illustrate a display state example in the case that the operation period changes such as monitoring period→moving image recording period-→monitoring period→playback period, i.e., a case where recording of a moving image is executed according to monitoring period→moving image recording period, and then during the monitoring period, the monitoring period is proceeded to the playback period by the user's operation or the like.

The example #6 is a case where the process in FIG. 7A serving as the process during the monitoring period, the process in FIG. 17A serving as the process during the moving image recording period, and the process in FIG. 14B serving as the process during the playback period are employed.

With regard to the main display panel 6M, monitoring image display is constantly executed during the monitoring period. Also, during the moving image recording period, monitor image display under recording is also executed. Also, during the playback period, playback display is executed.

With regard to the front display panel 6F, during the monitoring period monitoring image monitoring image display is executed, or the display is turned off, depending on whether or not there is a visual recognition possibility. During the moving image recording period as well, monitor display under recording is executed, or the display is turned off, depending on whether or not there is a visual recognition possibility. Also, during the playback period as well, playback display is executed, or the display is turned off, depending on whether or not there is a visual recognition possibility.

That is to say, this example #6 is an example wherein, with regard to the front display panel 6F, monitoring image display, recording monitor display, and playback display are executed constantly depending on visual recognition possibility conditions.

The example #7 is a case where the process in FIG. 7A serving as the process during the monitoring period, the process in FIG. 17B serving as the process during the moving image recording period, and the process in FIG. 14B serving as the process during the playback period are employed. Other than the moving image recording period is similar to the example #6.

With regard to the main display panel 6M, monitor image display under recording is also executed during the moving image recording period. With the front display panel 6F as well, monitor display under recording is constantly executed during the moving image recording period.

That is to say, this example #7 is an example wherein recording monitor display is also executed on the front display panel 6F constantly during recording of a moving image.

The example #8 is a case where the process in FIG. 7A serving as the process during the monitoring period, the process in FIG. 17C serving as the process during the moving image recording period, and the process in FIG. 14B serving as the process during the playback period are employed. Other than the moving image recording period is similar to the example #6.

With regard to the main display panel 6M, monitor image display under recording is also executed during the moving image recording period. With the front display panel 6F, the display is turned off during the moving image recording period.

That is to say, this example #8 is an example wherein recording monitor display is not executed on the front display panel 6F during recording of a moving image.

The transition examples of a display state accompanied with the transition of the recording period have been described as the examples #1 through #8 so far, but it goes without saying that various types of display process examples can be conceived other than these examples.

With the processes described as FIGS. 6 through 17C, one (or a modification) of FIGS. 7A and 7B, F102 in FIG. 11, F102 in FIGS. 12, and F102 in FIG. 13 can be employed as the process during the monitoring period.

One (or a modification) of FIGS. 8A through 8D, and FIG. 9 can be employed as the process during the still image recording period.

One (or a modification) of FIG. 10, F106 in FIG. 11, F106 in FIGS. 12, and F106 in FIG. 13 can be employed as the process during the preview period.

One (or a modification) of FIGS. 14A and 14B, and FIG. 15 can be employed as the process during the playback period.

One (or a modification) of FIGS. 17A, 17B, and 17C can be employed as the process during the moving image recording period.

That is to say, those process examples are combined, whereby a transition example of the display state according to operation transition is assumed variously.

With the imaging apparatus 1 according to the present embodiment, the display states of the main display panel 6M and the front display panel 6F are controlled for each type of operation period that changes at a stage of operation, such as the above examples #1 through #8.

For example, at the time of proceeding to the monitoring period, still image recording period, preview period, playback period, moving image recording period, or the like, the display states are controlled according to the purpose of display, presence of a person viewing the display, or the like.

Particularly, during at least one or more operation periods, display control is executed whereby the main display panel 6M and the front display panel 6F may have different display content. The different display content mentioned here means a state in which a different image is displayed on both display panels, or state in which the display of one of the display panels is turned off, and that may have different display content means that both display panels have different display content according to, for example, the results of condition determination.

For example, with the example #1, during the monitoring period and the preview period, the main display panel 6M and the front display panel 6F may have different display content. Also, during the payback period both display panels have different display content. With the other examples #2 through #8 as well, during at least one or more operation periods, display control is executed whereby the main display panel 6M and the front display panel 6F may have different display content.

Such control is executed, whereby suitable display, useful display, avoidance of wasteful display, or the like is realized on each display panel for each operation period.

Modification Examples

The various types of process examples, and modifications serving as embodiments have been described so far, but further various modifications can be conceived as embodiments of the present invention.

With the above examples, with regard to the front display panel 6F, for example, in the case that visual recognition possibility conditions are not satisfied, the display is turned off. However, an example may be conceived wherein, in such a case, instead of turning off the display, the front display panel 6F is changed to a low-intensity display state, or a playback image or preset image is displayed.

For example, in the case that the process in FIG. 7A proceeds to step F205, a monitoring image is displayed in a state in which display luminance is decreased on the front display panel 6F. For example, in the case that a display device made up of self emitting elements such as an organic EL panel is used as the front display panel 6F, decrease in display luminance is useful for reduction in consumption power. Accordingly, when visual recognition possibility conditions are not satisfied due to that there is no person in front, that visibility is too bad to view display, or the like, display luminance is decreased, whereby reduction in consumption power is realized.

Also, for example, in the case that the process in FIG. 7A proceeds to step F205, an image unrelated to a monitoring image, such as a preset image, playback image, or the like, is displayed on the front display panel 6F. For example, even in the case that assumption is made that there is no person serving as a subject in front, or that visibility is too bad to view display, there are many situations wherein there is a person nearby. Also, there is a case where a person is in a situation wherein the person can readily view the display of the front display panel 6F, depending on the position of the person thereof.

For a person who is present in those circumferences, the display on the front display panel 6F can be recognized as a part of the external view design of the imaging apparatus 1, which would be interesting.

Also, in such a case, the user can select an image to be displayed on the front display panel 6F, whereby the user can set the external view of his imaging apparatus 1 arbitrarily, and accordingly, the user can enjoy camera use in more ways.

These processes can be conceived as a modification of the process in the case that the display of the front display panel 6F is turned off in FIGS. 8A and 8B, and a modification of the process in the case that the display of the front display panel 6F is turned off in steps F507 and F508 in FIG. 9. Similarly, these processes can also be applied to step F603 in FIG. 10, step F205 in FIG. 11, step F205 in FIG. 12, step F205 in FIG. 13, step F701 in FIG. 14A, step F713 in FIG. 14B, step F805 in FIG. 17A, and step F821 in FIG. 17C.

Also, for example, an arrangement may be made wherein, in the case that common monitoring image display or common preview display or the like is not executed on the front display panel 6F, the user can select whether to turn off the display of the front display panel 6F, whether to set the display of the front display panel 6F to low-intensity display, or whether to display a playback image or preset image on the front display panel 6F.

With the present example, an apparatus generally called a digital still camera has been exemplified as the imaging apparatus 1, but an embodiment of the present invention can be applied to various types of apparatuses, for example, such as video cameras, cellular phones having imaging functions, PDAs (Personal Digital Assistant), and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a first display;
a second display, the second display being on a side of the imaging apparatus opposite of a side thereof the first display is on; and
a display control unit configured to control display states of the first display and the second display,
wherein, in a first predetermined period as a monitoring display period, the display control unit is configured to control the first display to display a monitoring image and control the second display in a predetermined state based on an image capturing mode specified by a user, and
in response to a first user operation in the first predetermined period, the display control unit is configured to control changing display states of the first display and the second display,
wherein the first display is parallel to the second display,
wherein in response to the first user operation in the first predetermined period to switch to a recording period, the display control unit is configured to control switching from displaying the monitoring image in the first display to not displaying any given monitoring image in the first display,
wherein in response to a second user operation in the first predetermined period to switch to a playback display mode, the display control unit is configured to control switching from displaying the monitoring image in the first display to displaying a first information in the first display and control the second display to display a second information, and
wherein the first information and the second information are playback information related to the playback display mode.

2. The imaging apparatus according to claim 1, wherein the first display is a touch panel.

3. The imaging apparatus according to claim 2, wherein the imaging apparatus is configured to control a playback period arranged to play and display image data recorded in a recording medium.

4. The imaging apparatus according to claim 1, wherein in the first predetermined period, the first display state and the second display state are different.

5. The imaging apparatus according to claim 1, wherein in the first predetermined period, an icon is displayed on the first display.

6. The imaging apparatus according to claim 1, further comprising:
an imaging lens arranged at a same side of the imaging apparatus as the second display.

7. The imaging apparatus according to claim 1, wherein the states of the first display and the second display in the first predetermined period are controlled based on a result of a visual recognition process.

8. The imaging apparatus according to claim 7, wherein the visual recognition process is a process of determining the image capturing mode specified by the user from among a plurality of image capturing modes.

9. The imaging apparatus according to claim 7, wherein the visual recognition process is a process of determining internal information of the imaging apparatus that includes at least one of external light quantity detection information, zoom position information, focus information, shaking detection information or the subject distance information.

10. The imaging apparatus according to claim 7, wherein the visual recognition process is a process of determining information of a subject based on an image analysis process.

11. The imaging apparatus according to claim 10, wherein the image analysis process includes analyzing the subject as a person regarding presence of a person in an image, using face information of a person in the image.

12. The imaging apparatus according to claim 11, wherein the face information includes size information of a face, face orientation and a direction in which eyes are directed.

13. The imaging apparatus according to claim 1, further comprising:
a recording apparatus configured to record an image in an image recording process.

14. The imaging apparatus according to claim 13, wherein the display states of the first display and the second display are controlled in the image recording process.

15. The imaging apparatus according to claim 1, wherein the imaging capturing apparatus is configured to capture an image of a subject.

16. The imaging apparatus according to claim 1, wherein a first display state is POWER ON or POWER OFF of the first display and POWER ON or POWER OFF of the second display, respectively.

17. A method for an imaging apparatus, wherein the imaging apparatus includes a first display and a second display, the second display being on a side of the imaging apparatus opposite of a side thereof the first display is on, the method comprising:
controlling display states of the first display and the second display,
wherein, in a first predetermined period as a monitoring display period, controlling the first display to display a monitoring image and the second display in a predetermined state based on an image capturing mode specified by a user,
wherein, in response to a first user operation in the first predetermined period, controlling changing display states of the first display and the second display,
wherein in response to the first user operation in the first predetermined period to switch to a recording period, controlling switching from displaying the monitoring image in the first display to not displaying any given monitoring image in the first display,
wherein in response to a second user operation in the first predetermined period to switch to a playback display mode, controlling switching from displaying the monitoring image in the first display to displaying a first information in the first display and controlling the second display to display a second information, wherein the first information and the second information are playback information related to the playback display mode, and wherein the first display is parallel to the second display.

* * * * *